(12) United States Patent
Niwa et al.

(10) Patent No.: US 8,346,494 B2
(45) Date of Patent: Jan. 1, 2013

(54) PHYSICAL QUANTITY MEASUREMENT DEVICE

(75) Inventors: Masahisa Niwa, Suita (JP); Kunitaka Okada, Ibaraki (JP); Itsushi Tadamasa, Takarazuka (JP)

(73) Assignee: Panasonic Corporation, Osaka (JP)

( * ) Notice: Subject to any disclaimer, the term of this patent is extended or adjusted under 35 U.S.C. 154(b) by 449 days.

(21) Appl. No.: 12/622,783

(22) Filed: Nov. 20, 2009

(65) Prior Publication Data

US 2010/0131222 A1  May 27, 2010

(30) Foreign Application Priority Data

Nov. 21, 2008 (JP) ................................. 2008-298580
Nov. 21, 2008 (JP) ................................. 2008-298582
Jun. 25, 2009 (JP) ................................. 2009-151643

(51) Int. Cl.
*G01R 15/00* (2006.01)

(52) U.S. Cl. ............ 702/57; 702/60; 702/104; 702/127; 702/189

(58) Field of Classification Search ............... 702/60, 702/104, 127, 189, 57; 700/286; 324/71.1, 324/76.11; 73/152.02

See application file for complete search history.

(56) References Cited

U.S. PATENT DOCUMENTS

| 5,270,972 A | * | 12/1993 | Craig et al. | ............. 365/189.03 |
| 6,324,482 B1 | * | 11/2001 | Nakagaki et al. | ............. 702/104 |
| 7,188,040 B2 | | 3/2007 | Nagase | |
| 2006/0044048 A1 | | 3/2006 | Nagase | |

FOREIGN PATENT DOCUMENTS

JP    2006-71336 A    3/2006

\* cited by examiner

*Primary Examiner* — Mohamed Charioui
*Assistant Examiner* — Elias Desta
(74) *Attorney, Agent, or Firm* — Cheng Law Group, PLLC

(57) ABSTRACT

The physical quantity measurement device involves a terminal unit, a sensor, a storage unit, an output unit, a communication unit, a control unit, and a discriminating unit. The terminal unit has a power terminal, an output terminal, and a ground terminal. The communication unit uses the power terminal in order to receive a serial signal from an external device. The control unit has an adjusting mode and a normal mode. The discriminating unit decides that the external device requests either the adjusting mode or the normal mode based on whether or not an electrical potential of each of the power terminal and the output terminal satisfies a predetermined condition. The control unit selects the normal mode when the discriminating unit decides that the external device requests the normal mode, and selects the adjusting mode when the discriminating unit decides that the external device request the adjusting mode.

8 Claims, 21 Drawing Sheets

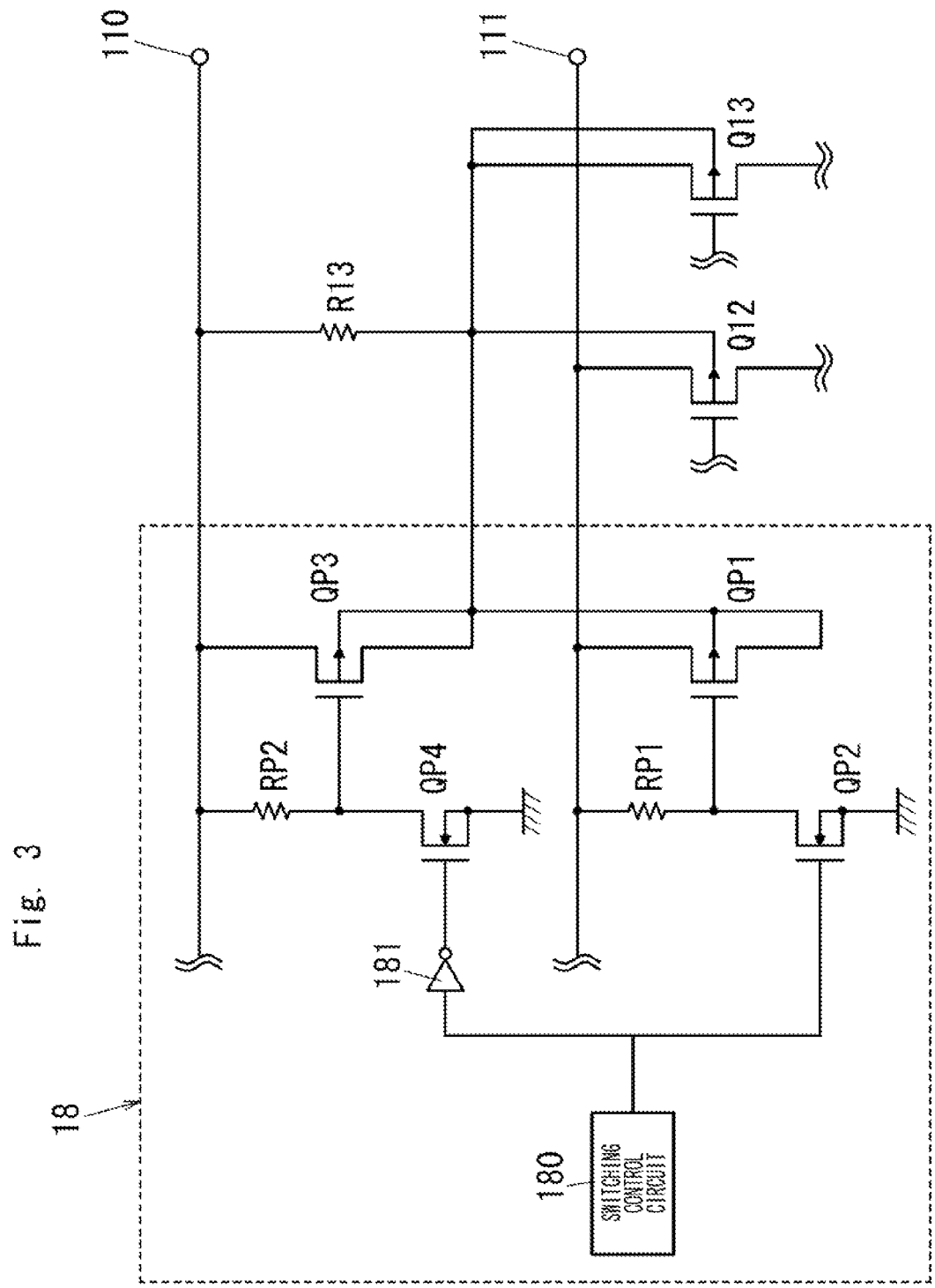

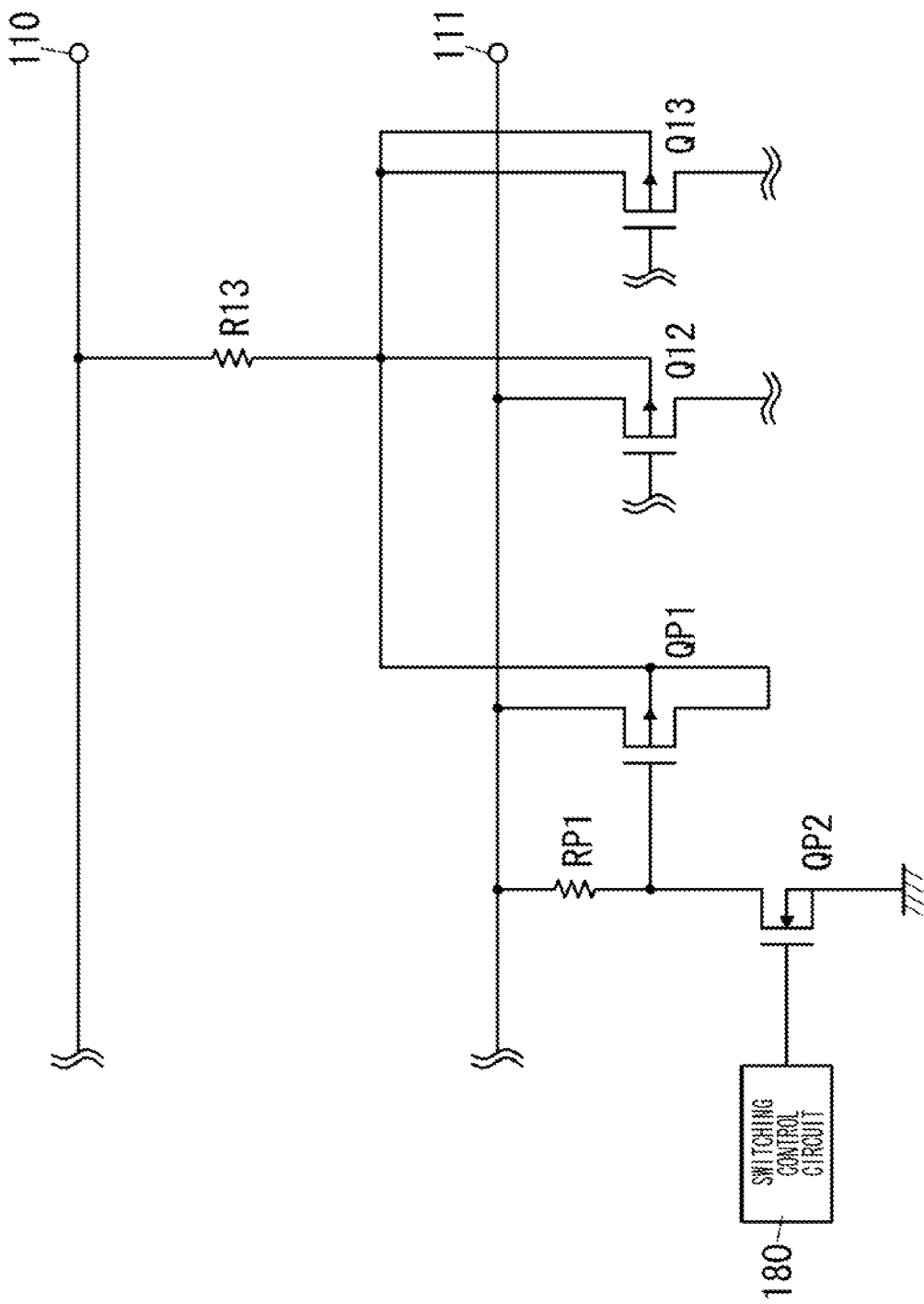

PHYSICAL QUANTITY MEASUREMENT DEVICE

TECHNICAL FIELD

The present invention is relates to a physical quantity measurement device.

BACKGROUND ART

A physical quantity measurement device which detects physical quantity, such as an acceleration sensor, an angular accelerometer, a pressure sensor, a weight sensor, and a magnetic sensor is provided.

A document 1 (JP 2006-71336 A) discloses a physical quantity measurement device which is capable of adjusting an output characteristics.

The physical quantity measurement device disclosed in the document 1 has a sensor circuit including a trimming circuit. The trimming circuit performs an electrically trimming, such as a sensitivity setting, an offset setting, and a temperature offset characteristics, for sensing element. The sensor circuit has only three terminals, namely, a pair of power terminals and one output terminal. One of power terminals is used for grounding.

The above physical quantity measurement device does not require any specific terminal for trimming, because the output terminal is available as an input terminal for inputting trimming data.

Therefore, an external device interoperating with the above physical quantity measurement device needs a plurality of communication devices each of which communicates with each of the physical quantity measurement device, in order to adjust a plurality of physical quantity measurement devices (for example, a sensor module having a plurality of physical quantity detection devices). That is the reason why it is difficult to simplify construction of the external device.

In some cases, the output terminal is directly connected to a load controlled by an output of the physical quantity measurement device. In this case, communicating with the external device through the output terminal is likely to cause malfunction of the load. Moreover, the load is likely to prevent or to limit communication between the physical quantity measurement device and the external device.

DISCLOSURE OF THE INVENTION

In view of the above insufficiency, the present invention has been accomplished to provide a physical quantity measurement device which is capable of simplifying construction of the external device interoperated with the physical quantity measurement device.

The physical quantity measurement device according to the present invention involves a terminal unit, a sensor, a storage unit, an output unit, a communication unit, a control unit, and a discriminating unit. The terminal unit has a power terminal, an output terminal, and a ground terminal. The power terminal and the output terminal are adapted in use to be connected to an external device. The sensor is configured to detect a predetermined physical quantity. The storage unit is configured to store predetermined property information. The output unit is configured to output the physical quantity detected by the sensor to the external device. The communication unit is configured to establish serial communications with the external device. The control unit is configured to have an adjusting mode in which the control unit updates the property information stored in the storage unit to received the property information from the external device, and a normal mode in which the control unit does not update the property information stored in the storage unit. The discriminating unit is configured to judge whether or not an electrical potential of each of the power terminal and the output terminal satisfies a predetermined condition. The discriminating unit is configured to decide that the external device requests the adjusting mode when the electrical potential of each of the power terminal and the output terminal satisfies the predetermined condition. The discriminating unit is configured to decide that the external device requests the normal mode when the electrical potential of at least one of the power terminal and the output terminal does not satisfy the predetermined condition. The control unit is configured to select the normal mode when the discriminating unit decides that the external device requests the normal mode, and is configured to select the adjusting mode when the discriminating unit decides that the external device request the adjusting mode. The communication unit is configured to use the power terminal in order to receive a serial signal from the external device.

In the present invention, it is unnecessary to increase the number of the terminal of the terminal unit in order to switch to the adjusting mode. Moreover an accuracy of the judging the operational mode is improved than the physical quantity measurement device discriminates the requested operational mode based on whether or not the electric potential (changes in potential) of any one of the power terminal and the output terminal satisfies the predetermined condition. Therefore, unexpected switching of the operational mode is prevented. The power terminal is used for communicating with the external device in the adjusting mode. It is unnecessary to provide a plurality of a communication device corresponding to a plurality of the physical quantity measurement device to the external device, because the communication device is able to communicate with each of the physical quantity measurement devices. Therefore, the physical quantity measurement device is able to simplify the external device. Moreover, the external device is able to select the physical quantity measurement device which the external device requests to switch to the adjusting mode, by use of the output terminal.

Preferably, the discriminating unit is configured to decide that the external device requests the adjusting mode, when the electrical potential of each of the power terminal and the output terminal satisfies the predetermined condition for a predetermined time period.

Accordingly, the physical quantity measurement device can prevent the control unit from unexpected switching to the adjusting mode.

Preferably, the physical quantity measurement device further involves a power supply unit configured to generate a drive voltage for activating the physical quantity measurement device. The external device is configured to energize the physical quantity measurement device through the power terminal while the external device requests the normal mode and to energize the physical quantity measurement device through the output terminal while the external device requests the adjusting mode. The power supply unit is configured to generate the drive voltage by use of power received from the external device via the power terminal in the normal mode and to generate the drive voltage by use of power received from the external device via the output terminal in the adjusting mode.

Accordingly, the physical quantity measurement device is able to operate stably.

Furthermore, the communication unit is configured to change an electrical potential of a serial signal to be transmitted to the external device into high-level by short circuiting between the output terminal and the power terminal.

Accordingly, it is suppressed that the electric potential (the high level potential and the low level potential) of the serial signal is varied by a variation of resistances of electrical components composing the physical quantity measurement device. Accuracy of serial communications between the physical quantity measurement device and the external device is improved. Moreover the physical quantity measurement device is capable of improving static electricity endurance.

Moreover, the communication unit includes a voltage lowering circuit configured to lower an electric potential of the output terminal at the time of the adjusting mode and to apply the same to the power terminal. The communication unit is configured to utilize an electric potential applied to the power terminal by the voltage lowering circuit as a low-level potential of an output serial signal to be transmitted to the external device. The voltage lowering circuit is composed of a diode having its anode coupled to the output terminal and having its cathode coupled to the power terminal.

Accordingly, it is suppressed that the electric potential (the high level potential and the low level potential) of the serial signal is varied by a variation of resistances of electrical components composing the physical quantity measurement device. Accuracy of serial communications between the physical quantity measurement device and the external device is improved. Moreover the physical quantity measurement device is capable of improving static electricity endurance.

Preferably, the physical quantity measurement device involves a bypass capacitor coupled to the power terminal. The communication unit includes a driver circuit configured to lower an electric potential of the power terminal to an electric potential corresponding to a low-level of an output serial signal to be transmitted to the external device from an electric potential corresponding to a high-level of the output serial signal. The driver circuit is configured to increase a discharge current of the bypass capacitor at the start of switching a level of the output serial signal to low-level from high-level than at the end of the switching.

Accordingly, the physical quantity measurement device is able to lower the electric potential of the serial signal to be transmitted to the external device from the high level potential to the low level potential rapidly. Moreover, the physical quantity measurement device is capable of preventing that the electric potential of the serial signal lowers excessively.

Preferably, the physical quantity measurement device involves an integrated circuit composed of a monolithic integrated circuit. The integrated circuit includes the terminal unit, the storage unit, the output unit, the communication unit, the control unit, the discriminating unit, a semiconductor element, and a switching unit. The external device is configured to connect the feed unit to the power terminal while the external device requests the normal mode, and to connect the feed unit to the output terminal while the external device requests the adjusting mode. The semiconductor element includes an N-type bulk, and a P-type region formed in the N-type bulk. The switching unit is configured to couple the N-type bulk of the semiconductor element to the power terminal in the normal mode and to couple the N-type bulk of the semiconductor element to the output terminal in the adjusting mode.

In this case, the measurement device is capable of preventing unintended current from flowing through the N-type bulk of the semiconductor element when the operational mode is switched.

Alternatively, the physical quantity measurement device involves an integrated circuit composed of a monolithic integrated circuit. The integrated circuit includes the terminal unit, the storage unit, the output unit, the communication unit, the control unit, the discriminating unit, a semiconductor element, a comparing unit and a switching unit. The semiconductor element includes an N-type bulk and a P-type region formed in the N-type bulk. The P-type region is connected to the power source or the output terminal. The comparing unit is configured to compare an electric potential of the power terminal with an electric potential of the output terminal. The switching unit is configured to couple the N-type bulk of the semiconductor element to the power terminal when a discrimination of the discriminating unit indicates the normal mode, and to couple the N-type bulk of the semiconductor element to one having the highest potential among the power terminal and the output terminal on the basis of a comparison result of the comparing unit when the discriminating unit indicates the adjusting mode.

In this case, the measurement device is capable of preventing unintended current from flowing through the N-type bulk of the semiconductor element when the operational mode is switched.

BRIEF DESCRIPTION OF THE DRAWINGS

FIG. 3 shows a block diagram illustrating a switching unit of the above physical quantity measurement device;

FIG. 6 shows a block diagram illustrating the other switching unit of the above physical quantity measurement device;

MODE FOR CARRYING OUT THE INVENTION

1st Embodiment

Figure 1:
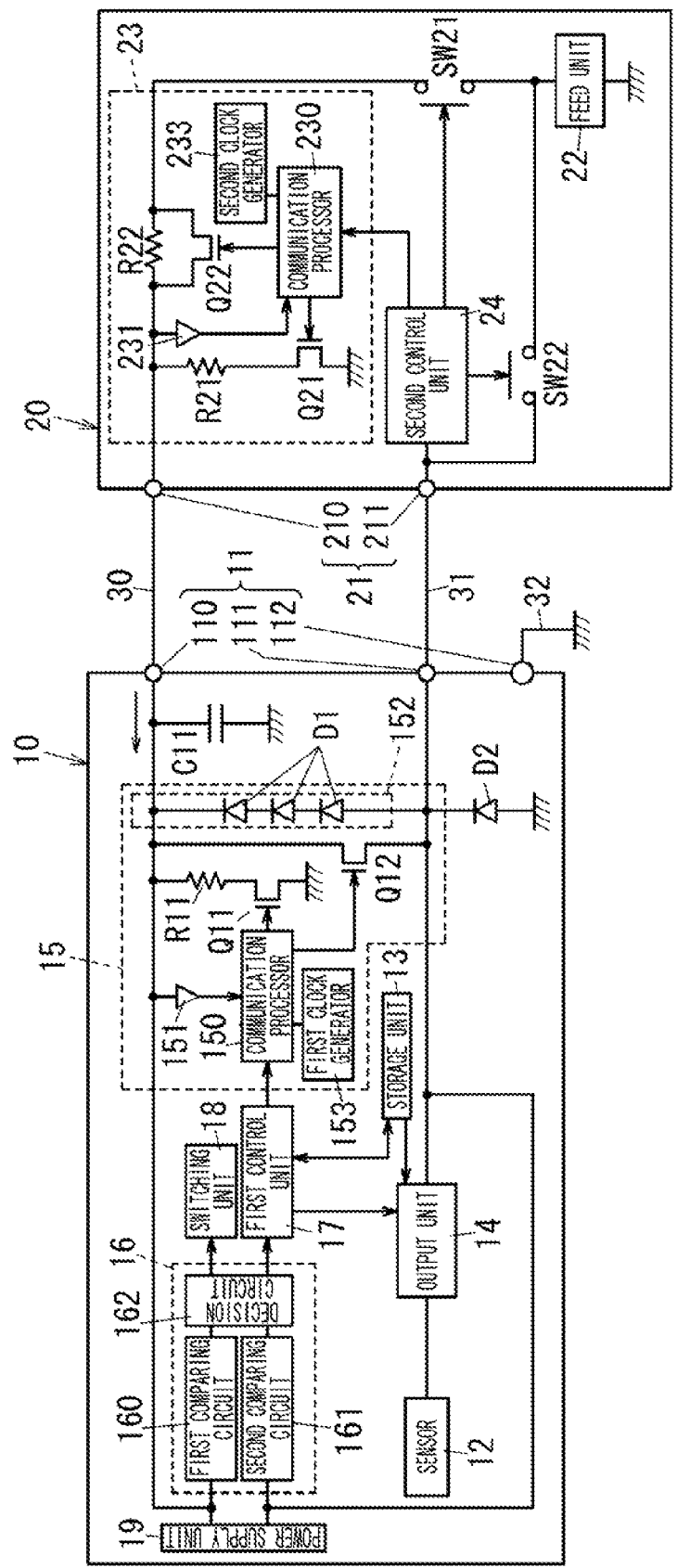
FIG. 1 shows a block diagram illustrating a physical quantity detecting system involving a physical quantity measurement device of a 1st embodiment.

A physical quantity measurement device 10 according to the present embodiment is applied to a physical quantity detecting system shown in FIG. 1.

Figure 2:
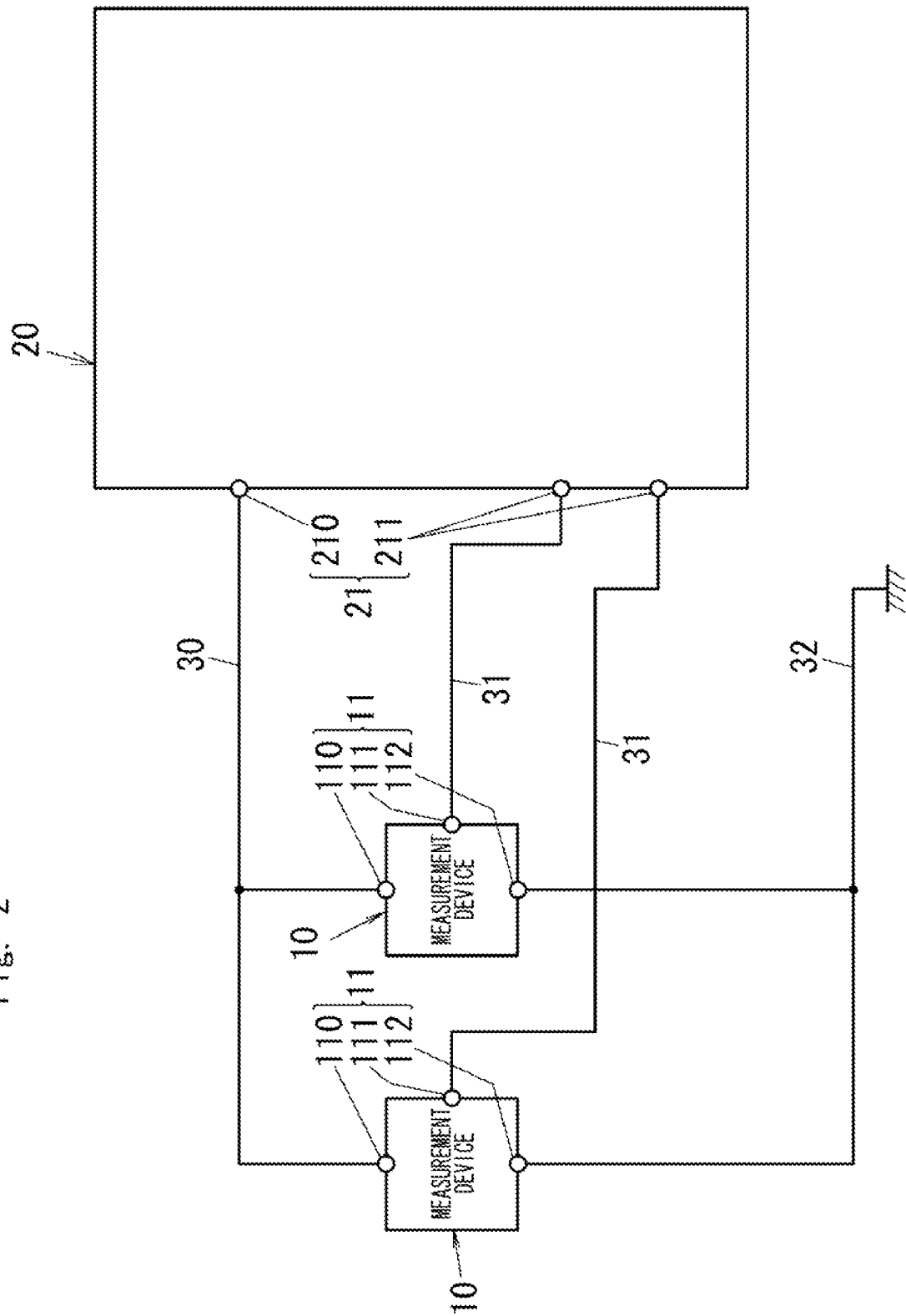
FIG. 2 shows a block diagram illustrating the physical quantity detecting system.

Referring FIG. 2, the physical quantity detecting system involves a plurality of physical quantity measurement devices 10, and a management device 20 as an external device. The measurement device 10 is used as a slave, and the management device 20 is used as a master. This physical quantity detecting system is applicable to engine control system employing an Electronic Control Unit.

The measurement device 10 includes a terminal unit (a first terminal unit) 11, a sensor 12, a storage unit 13, an output unit 14, a communication unit (a first communication unit) 15, a discriminating unit 16, a control unit (a first control unit) 17, a switching unit 18, and a power supply unit 19. Electrical equipment which constructs the measurement device 10 is housed in a case (not shown).

The sensor 12 is configured to detect a predetermined physical quantity (for example, acceleration), and to output a detection signal indicating the detected physical quantity (a detection value). The detection signal has an electrical potential corresponding to magnitude of the detected physical quantity. The sensor 12 is a sensing element, such as an acceleration sensor, an angular accelerometer, a pressure sensor, a weight sensor, and a magnetic sensor.

The first terminal unit 11 has a power terminal 110, an output terminal 111, and a ground terminal 112. The power terminal 110 and the output terminal 111 are adapted in use to be connected to the management device 20. The power terminal 110 is a terminal for receiving an electrical power from the management device 20. The output terminal 111 is a terminal for outputting the detection signal to the management device 20. The ground terminal 112 is a terminal for connecting to a reference potential point such as the ground. In the present embodiment, the power terminal 110 and the output terminal 111 are coupled to the management device 20.

A bypass capacitor C11 is connected between the power terminal 110 and the ground terminal 112 in order to reduce high-frequency noise such as power-supply noise and radiation noise.

The output terminal 111 is grounded through a diode D2. The diode D2 has its cathode connected to the output terminal 111 and has its anode connected to the ground.

The ground terminal 112 is linked to the ground (such as an automobile body) through an electrical wire (an earthing wire) 32.

The storage unit 13 is, for example, a nonvolatile memory (an electrically writable storage medium, such as a flash memory, an EEPROM, a fuse, and an OTPROM). The storage unit 13 is configured to store property information (characteristic information) indicating information about the measurement device 10. In the present embodiment, property information is correction value used for correcting the detection signal (a detection output), namely, detection value.

The output unit 14 is configured to correct the detection signal of the sensor 12. For example, the output unit 14 acquires the detection value from the detection signal received from the sensor 12. The output terminal 14 corrects the acquired detection value by use of the correction value stored in the storage unit 13. The output unit 14 outputs a signal having an electrical potential corresponding to corrected detection value as a detection signal (a corrected detection signal) to the output terminal 111.

In the present embodiment, the output unit 14 executes an offset processing and a gain processing. In the offset processing, the output unit 14 is configured to add predetermined additional value (offset value) to the detection value. In the gain processing, the output unit 14 multiplies the offset processed detection value by predetermined multiplication value (gain value). The correction value stored includes the offset value and the gain value.

The offset processing and the gain processing are executed in order to limit to expected range an electric potential of the detection signal output from the sensor 12. For example, environment of the measurement device 10 may cause that the electric potential of the detection signal exceeds value which the management device 20 can detect. Moreover, each product may have a difference in a range of the detection value in the cause of characteristic variation of its parts. However, the offset processing or the gain processing is able to solve these problems.

Besides, the output unit 14 may be configured to execute a temperature correction processing in addition to the offset processing and the gain processing. The output unit 14 may be configured to execute the other correction processing such as a processing in which the output unit 14 inverts the electric potential of the detection signal. The output unit 14 may be configured to execute these processing selectively. In this case, property information may be information determining a processing which the output unit 14 executes. The output unit 14 may have a first function in which the output unit 14 outputs resultant corrected detection value of the sensor 12, and a second function in which the output unit 14 outputs intermediate corrected detection value of the sensor 12. In this case, property information may be information determining which function (the first function or the second function) the output unit 14 executes.

The first communication unit 15 is configured to establish wired communications (serial communications) with the management device 20 by use of the power terminal 110. That is, the first communication unit 15 receives a serial signal from the management device 20 through the power terminal 110. The first communication unit 15 includes a communication processor 150, a judging circuit 151, switches Q11 and Q12, a resistor R11, a voltage lowering circuit 152, and a clock generator (a first clock generator) 153.

The judging circuit 151 has a comparator which compares an electric potential of the power terminal 110 to a first signal reception threshold (for example, 10V). The judging circuit 151 judges the electric potential of the power terminal 110 as a high level while the electric potential of the power terminal 110 exceeds the first signal reception threshold, and judges the electric potential of the power terminal 110 as a low level while the electric potential of the power terminal 110 is not greater than the first signal reception threshold.

The first clock generator 153 is configured to output a first clock signal (a first clock pulse) to the communication processor 150.

The switch Q11 is an N-channel MOSFET. The switch Q11 has its drain connected to the power terminal 110 through the resistor R11, and has its source connected to the ground.

The switch Q12 is a semiconductor element including an N-type bulk and a P-type region formed in the N-type bulk. In the present embodiment, the switch Q12 is a P-channel MOSFET. The switch Q12 has its drain connected to the output terminal 111, and has its source connected to the power terminal 110. Referring to FIG. 3, the switch Q12 has its back gate connected to its source through the switching unit 18.

The resistor R11 is connected between the switch Q11 and the power terminal 110. While the switch Q11 is turned on, the resistor R11 lowers the electric potential of the power terminal 110 to a predetermined potential lower than the electric potential of the power terminal 110 while the switch Q11 is kept turning off.

The electric potential lowering circuit 152 is configured to set to a low level an electric potential of a serial signal to be transmitted to the management device 20. The electric potential lowering circuit 152 is a series circuit composed of a plurality of diodes D1 connected between the output terminal 111 and the power terminal 110. Each of the diode D1 has its anode electrically connected to the output terminal 111, and has its cathode electrically connected to the power terminal 110. In the present embodiment, the number of diodes D1 is three. A voltage drop of the diode D1 is 0.7 V. Therefore, the voltage lowering circuit has a voltage drop of 2.1 V. Besides, the electric potential lowering circuit 152 may have only one diode D1. However, using a plurality of diodes D1 simplifies setting an electric potential of the low level of the serial signal. The diode D1 and D2 protect the output terminal 111 from static electricity and surges in an after-mentioned normal mode.

The communication processor 150 is, for example, composed of logic circuits or micro computers. The communication processor 150 is configured to set a clock (a first communication clock) for transmitting the serial signal to the management device 20 and receiving the serial signal from the management device 20.

The communication processor 150 executes a reception processing of serial signals by use of the first clock generator 153 and the judging circuit 151. The reception processing is a processing for distinguishing bit series of the received serial signal from the management device 20. The communication processor 150 judges the electrical potential of the serial signal as a high level when the judging circuit 151 indicates that the electrical potential of the power terminal 110 is the high level. The communication processor 150 judges the electrical potential of the serial signal as the low level when the judging circuit 151 indicates that the electrical potential of the power terminal 110 is the low level. The communication processor 150 executes a transmission processing of serial signals by use of the first clock generator 153 and the switches Q11 and Q12. The transmission processing is a processing for varying the electric potential of the power terminal 110 in accordance with bit series of the serial signal to be transmitted to the management device 20. The communication processor 150 changes the electric potential of the serial signal into the high level by means of turning off the switch Q11 and turning on the switch Q12. In this case, the switch Q12 short circuits between the output terminal 111 and the power terminal 110. That is, the switch Q12 makes a low resistance connection between the output terminal 111 and the power terminal 110. The serial signal has a high level electrical potential VSH which is equal to the electric potential of the output terminal 111. In the present embodiment, the high level electrical potential VSH is an electrical potential of 12 V. The communication processor 150 changes the electric potential of the serial signal into the low level by means of turning on the switch Q11 and turning off the switch Q12. In this case, the power terminal 110 is grounded through the resistor R11 and the switch Q11. The serial signal has a low level electrical potential VSL which is equal to the electric potential of the output terminal 111 lowered by the electric potential lowering circuit 152. In the present embodiment, the low level electrical potential VSH is an electrical potential of 9.9 V. The communication processor 150 turns off the switches Q11 and Q12 during an idle state in which the communication processor 150 is waiting for reception of the serial signal from the management device 20.

In the first communication unit 15, the communication processor 150, the judging circuit 151, and the first clock generator 153 compose a reception circuit for receiving the serial signal which is input to the power terminal 110. The communication processor 150, the switches Q11 and Q12, the resistor R11, and the first clock generator 153 compose a transmission circuit for outputting the serial signal to the power terminal 110.

The discriminating unit 16 is configured to discriminate an operational mode requested by the management device 20 based on whether or not the electric potential (changes in potential) of each of the power terminal 110 and the output terminal 111 satisfies a predetermined condition.

The operational mode includes the normal mode, an adjusting mode, and a transition mode. The operational mode of the measurement device 10 is decided by the management device 20.

The discriminating circuit 16 has a first comparing circuit 160, a second comparing circuit 161, and a decision circuit 162.

The first comparing circuit 160 is configured to compare the electric potential of the power terminal 110 to a first threshold Vth1. The second comparing circuit 161 is configured to compare the electric potential of the output terminal 111 to a second threshold Vth2. Each of the comparing circuits 160 and 161 is composed of a comparator.

The first threshold Vth1 is lower than the potential VSL of the serial signal, and for example the first threshold Vth1 is an electrical potential of 6V. The second threshold Vth2 is different from the first threshold Vth1, and for example the second threshold Vth2 is an electrical potential of 11V.

The decision circuit 162 is configured to decide the operational mode requested by the management device 20 on the basis of comparison of each of the comparing circuit 160 and 161.

Figures 4A, 4B:
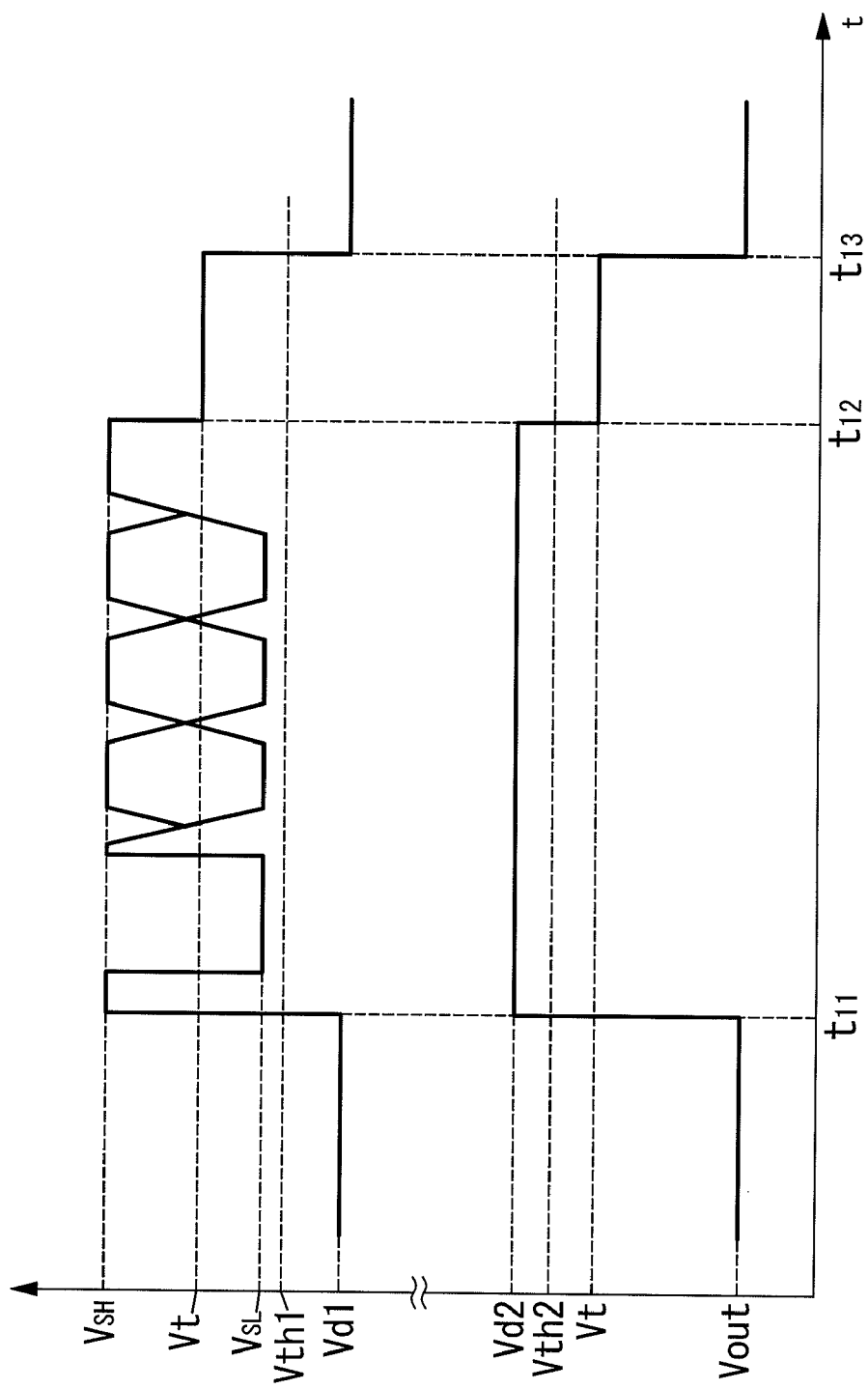
FIG. 4A shows a wave form chart illustrating an electric potential of a power terminal of the above physical quantity measurement device.
FIG. 4B shows a wave form chart illustrating an electric potential of an output terminal of the above physical quantity measurement device.

In the present embodiment, the decision circuit 162 decides that the operational mode requested by the management device 20 is the adjusting mode when the electric potential of the power terminal 110 is not less than the first threshold Vth1 and the electric potential of the output terminal 111 is not less than the second threshold Vth2 (in FIG. 4, t11 to t12).

The decision circuit 162 decides that the requested operational mode is the normal mode when the electric potential of the power terminal 110 is less than the first threshold Vth1 and the electric potential of the output terminal 111 is less than the second threshold Vth2 (in FIG. 4, before t11 or after t13).

The decision circuit 162 decides that the management device 20 requests the transition mode when both of the electric potential of the power terminal 110 and the output terminal 111 are between the first threshold Vth1 and the second threshold Vth2 (in FIG. 4, t12 to t13). In the present embodiment, the first threshold Vth1 is less than the second threshold Vth2. The decision circuit 162 decides that the management device 20 requests the transition mode when both of the electric potential of the power terminal 110 and the output terminal 111 are not less than the first threshold Vth1 and are less than the second threshold Vth2. When the electric potential of the power terminal 110 is not less than the first threshold Vth1 and the electric potential of the output terminal 111 is less than the second threshold Vth2, the decision circuit 162 considers that both of the electric potential of the power terminal 110 and the output terminal 111 are not less than the first threshold Vth1 and are less than the second threshold Vth2, and then decides that the management device 20 requests the transition mode.

The discriminating unit 16 sends own judgment to the first control unit 17 and the switching unit 18. That is, the discriminating unit 16 sends the judgment indicating the adjusting mode, upon deciding that the management device 20 requests the adjusting mode. The discriminating unit 16 sends the judgment indicating the normal mode, upon deciding that the management device 20 requests the normal mode. The discriminating unit 16 sends the judgment indicating the transition mode, upon deciding that the management device 20 requests the transition mode.

The first control unit 17 is a controller which executes overall control of the measurement device 10. The control unit 17 is, for example, a micro computer. It is noted that the first control unit 17 may be integrated with the communication processor 150.

The first control unit 17 selects the adjusting mode when the discriminating unit 16 decides that the management device 20 requests the adjusting mode. The first control unit 17 selects the normal mode when the discriminating unit 16 decides that the management device 20 requests the normal mode. The first control unit 17 selects the transition mode when the discriminating unit 16 decides that the management device 20 requests the transition mode. The first control unit 17 performs below-mentioned behavior in accordance with the judgment provided by the discriminating unit 16.

When the judgment indicates the adjusting mode, the first control unit 17 deactivates the sensor 12 and the output unit 14, and thereby forbids outputting the detection signal. Further, the first control unit 17 activates the first communication unit 15, and thereby enables serial communications with the management device 20. Upon receiving the correction value from the management device 20 by serial communications, the first control unit 17 stores in the storage unit 13 the correction value from the management device 20. When the correction value is already stored in the storage unit 13, the first control unit 17 updates the correction value stored in the storage unit 13 to the correction value from the management device 20. Then, the first control unit 17 controls the first communication unit 15 such that the first communication unit 15 transmits the latest correction value stored in the storage unit 13 to the management device 20. In the adjusting mode, the first control unit 17 forbids the output unit 15 from outputting the detection signal and allows updating (rewriting) the correction value stored in the storage unit 13.

When the judgment indicates the normal mode, the first control unit 17 activates the sensor 12 and the output unit 14, and thereby allows outputting the detection signal. Further, the first control unit 17 deactivates the first communication unit 15, and thereby terminates serial communications with the management device 20. In the normal mode, the first control unit 17 allows outputting the detection signal and forbids rewriting the correction value stored in the storage unit 13. That is, the first control unit 17 forbids updating the property information stored in the storage unit 13 in the normal mode.

When the judgment indicates the transition mode, the first control unit 17 deactivates the sensor 12, the output unit 14, and the first communication unit 15.

Referring to FIG. 3, the switching unit 18 is configured to connect the back-gate (the N-type bulk) of the switch Q12 to the power terminal 110 or the output terminal 111 in accordance with the judgment provided by the discriminating unit 16. Beside, FIG. 3 shows a switch Q13 which is a P-channel MOSFET. The switch Q13 has its drain and back-gate connecting to the power terminal 110 through a resistor R13. The switch Q13 is, for example, used in the other component (such as the output unit 14 and the discriminating unit 16) of the measurement device 10.

Shown in FIG. 3, the switching unit 18 includes a switching control circuit 180, an inverter 181, switches QP1, QP2, QP3, and QP4, and resistors RP1 and RP2. It is preferable that the resistors RP1 and RP2 are poly-silicon resistors, or resistors produced without semiconductors (such as metal-film resistors and carbon-film resistors).

The switch QP1 is a P-channel MOSFET. The switch QP1 has its source connected to the output terminal 111. The switch QP1 has its drain and back-gate connected to the power terminal 110 through the resistor R13. The source of the switch QP1 is connected to gate of the switch QP1 through the resistor RP1. The resistor RP1 has a resistance which enables turning on the switch QP1 in response to turning on the switch QP2.

The switch QP2 is an N-channel MOSFET. The switch QP2 has its drain connected to the gate of the switch QP1 and the resistor RP1. The switch QP2 has its source and back-gate which are connected to the ground.

The switch QP3 is a P-channel MOSFET. The switch QP3 has its source connected to the power terminal 110. The switch QP3 has its drain and back-gate connected to the power terminal 110 through the resistor R13. The source of the switch QP3 is connected to gate of the switch QP3 through the resistor RP2. The resistor RP2 has a resistance which enables turning on the switch QP3 in response to turning on the switch QP3.

The switch QP4 is an N-channel MOSFET. The switch QP4 has its drain connected to the gate of the switch QP3 and the resistor RP2. The switch QP4 has its source and back-gate which are connected to the ground.

The switching control circuit 180 is configured to turn on and off the switches QP2 and QP4. The switching control circuit 180 has a control terminal connected to gate of the switch QP2. The control terminal of the switching control circuit 180 is connected to gate of the switch QP4 through the inverter 181.

The switching control circuit 180 outputs a high level control signal from the control terminal when the judgment of the discriminating unit 16 indicates the adjusting mode. The switching control circuit 180 outputs a low level control signal from the control terminal when the judgment of the discriminating unit 16 indicates the normal mode or the transition mode. The control signal output from the switching control circuit 180 is input to gate of the switch QP2, and also is input to gate of the switch QP4 after is inverted by the inverter 181. In the normal mode or the transition mode, the switch QP2 is turned off, and the switch QP4 is turned on. In this case, the switch QP1 is turned off, and the switch QP3 is turned on. Therefore, each of the back-gate of the switches Q12 and Q13 is connected to the power terminal 110 through the switch QP3. In the adjusting mode, the switch QP2 is turned on, and the switch QP4 is turned off. In this case, the switch QP1 is turned on, and the switch QP3 is turned off. Each of the back-gate of the switches Q12 and Q13 is connected to the output terminal 111 through the switch QP1.

As described above, the switching unit 18 connects each of the back-gate of the switches Q12 and Q13 to the output terminal 111 when the judgment of the discriminating unit 16 indicates the adjusting mode. The switching unit 18 connects each of the back-gate of the switches Q12 and Q13 to the power terminal 110 when the judgment of the discriminating unit 16 indicates the normal mode or the transition mode.

The power supply unit 19 is configured to generate a voltage (a drive voltage) which is needed to activate the measurement device 10 by use of an electrical power fed from the management device 20. The power supply unit 19 has a first power circuit (not shown) and a second power circuit (not shown). The first power circuit is configured to generate the drive voltage by use of an electrical power received at the power terminal 110. The second power circuit is configured to generate the drive voltage by use of an electrical power received at the output terminal 111. This means that the power supply unit 19 generates the drive voltage by use of the electrical power received from the management device 20 via the power terminal 110 in the normal mode, and to generate the drive voltage by use of power received from the management device 20 via the output terminal 111 in the adjusting mode. For example, the power supply unit 19 has a three terminal regulator which generates a predetermined voltage on the basis of a voltage between the power terminal 110 or the output terminal 111 and the ground terminal 112. It is noted that the power supply unit 19 can be omitted when voltages of the power terminal 110 and the output terminal 111 is capable of using as the drive voltage.

The management device 20 includes a terminal unit (a second terminal unit) 21, a feed unit 22, a communication unit (a second communication unit) 23, a control unit (a second control unit) 24. Electrical equipment which constructs the management device 20 is housed in a case (not shown).

The second terminal unit 21 is used for connecting the management device 20 to the measurement device 10. The second terminal unit 21 has a feed terminal 210 and an input terminal 211. The feed terminal 210 is a terminal for supplying an electrical power to the measurement device 10. The feed terminal 210 is connected to the power terminal 110 through an electrical wire (a feeder wire) 30. The input terminal 211 is a terminal for receiving the detection signal from the measurement device 10. The input terminal 211 is connected to the output terminal 111 through an electrical wire (a signal wire) 31.

The feed unit 22 is a power source used for supplying an electrical power to the measurement device 10. The feed unit 22 is connected to the feed terminal 210 through a switch SW21, and is connected to the input terminal 211 through the switch SW22. The feed unit 22 is, for example, composed of a battery (not shown) incorporated in a car, and a circuit (such as a step-down chopper, and a bandgap reference circuit) being able to lower a DC voltage of the battery to a predetermined voltage.

The feed unit 22 is configured to apply a first potential Vd1, a second potential Vd2, and a transition potential Vt selectively to the measurement device 10. The first potential Vd1 is not less than a power potential (for example 5V) which is needed to activate the measurement device 10, and is not less than the highest potential (for example 4V) of the detection signal. The second potential Vd2 is not less than the power potential, and is not less than the highest potential (the high level potential VSH, for example 12V) of the serial signal. The transition potential Vt is not less than the power potential. Preferably, the feed unit 22 is configured to keep on supplying an electrical power to the measurement device 10 when the output potential of the feed unit 22 is switched.

In the present embodiment, the first threshold Vth1 is 6V, and the second threshold Vht2 is 11V. Therefore, the first potential Vd1 is set as 5V, and the second potential Vd2 is set as 12V, and the transition potential Vt is set as 10V.

The second communication unit 23 is configured to establish wired communications (serial communications) with the measurement device 10 by use of the feed terminal 210. That is, the second communication unit 23 transmits the serial signal to the measurement device 10 through the feed terminal 210. The second communication unit 23 includes a communication processor 230, a judging circuit 231, switches Q21 and Q22, resistors R21 and R22, and a clock generator (a second clock generator) 233.

The judging circuit 231 has a comparator which compares an electric potential of the feed terminal 210 to a second signal reception threshold (for example, 10V). The judging circuit 231 judges the electric potential of the feed terminal 210 as a high level while the electric potential of the feed terminal 210 exceeds the second signal reception threshold, and judges the electric potential of the feed terminal 210 as a low level while the electric potential of the feed terminal 210 is not greater than the second signal reception threshold.

The switch Q21 is connected between the feed terminal 210 and the ground. The switch Q21 is a switch which is able to be turned on and off, such as semiconductor switching elements (for example, MOSFET), and electric relays.

The switch Q22 is connected between the feed unit 22 and the feed terminal 210.

The resistor R22 is connected across the switch Q22.

The second clock generator 233 is configured to output a second clock signal (a second clock pulse) to the communication processor 230.

The communication processor 230 is, for example, composed of logic circuits or micro computers. The communication processor 230 is configured to set a clock (a second communication clock) for transmitting the serial signal to the measurement device 10 and receiving the serial signal from the measurement device 10.

The communication processor 230 executes a reception processing of serial signals by use of the second clock generator 233 and the judging circuit 231. The communication processor 230 judges the electric potential of the serial signal as the high level when the judgment of the judging circuit 231 indicates that the electrical potential of the feed terminal 210 is the high level, and judges the electric potential of the serial signal as the low level when the judgment of the judging circuit 231 indicates that the electrical potential of the feed terminal 210 is the low level.

The communication processor 230 executes a transmission processing of serial signals by use of the second clock generator 233 and the switches Q21 and Q22. The communication processor 230 changes the electric potential of the serial signal into the high level electrical potential VSH by means of turning off the switch Q21 and turning on the switch Q22. The high level potential of the serial signal to be transmitted to the measurement device 10 is equal to the second potential Vd2 (=12V) of the feed unit 22. The communication processor 230 changes the electric potential of the serial signal into the low level electrical potential VSL by means of turning on the switch Q21 and turning off the switch Q22. In this case, the feed unit 22 is grounded through the resistors R21 and R22. The electric potential of the feed terminal 210 is equal to the output potential of the feed unit 22 divided by the resistor R21 and R22. The resistors R21 and R22 are selected to give a resistance such that the electric potential of the feed terminal 210 is lowered to an electric potential being not greater than the first signal reception threshold.

In the second communication unit 23, the communication processor 230, the judging circuit 231, and the second clock generator 233 compose a reception circuit for receiving the serial signal which is input to the feed terminal 210. The communication processor 230, the switches Q21 and Q22, the resistors R21 and R22, and the second clock generator 233 compose a transmission circuit for outputting the serial signal to the feed terminal 210.

The first control unit 24 is a controller which executes overall control of the management device 20. The second control unit 24 is configured to request the measurement device 10 to switch the operational mode in accordance with an instruction of an input output device (not shown). The second control unit 24 is, for example, a micro computer. It is noted that the second control unit 24 may be integrated with the communication processor 230.

Above-mentioned input output device has an input device such as control button used for inputting information by user, and an output device such as graphic display device displaying information for user. The input output device is integrated with the management device 20, or is apart from the management device 20.

The second control unit 24 is configured to turn on the switches SW21 and SW22 upon receiving an instruction which indicates switching the operational mode from the normal mode to the adjusting mode. The second control unit 24 further changes the electric potential of the feed unit 22 into the second potential Vd2 (=12V).

The second control unit 24 is configured to request the measurement device 10 to switch to the normal mode from the adjusting mode through the transition mode, upon receiving an instruction which indicates switching to the normal mode from the adjusting mode.

That is, the second control unit 24 turns on the switches SW21 and SW22 at first. The second control unit 24 further changes the electric potential of the feed unit 22 into the transition potential Vt (=10V). After a lapse of predetermined waiting time, the second control unit 24 turns on the switch SW21 and turns off the SW 22. The second control unit 24 further changes the electric potential of the feed unit 22 into the first potential Vd1 (=5V). Above-mentioned waiting time is not shorter than a time which is needed to switch from the adjusting mode to the transition mode. Preferably, the second control unit 24 changes the electric potential of the feed unit 22 into the first potential Vd1 (=5V) after turning off the switch SW22 to open the output terminal 111.

The management device 20 is configured to apply the first potential Vd1 to the power terminal 110 while the management device 20 requests the normal mode. The management device 20 is configured to apply the second potential Vd2 to both of the power terminal 110 and the output terminal 111 while the management device 20 requests the adjusting mode. The management device 20 is configured to apply the transition potential Vt to both of the power terminal 110 and the output terminal 111 while the management device 20 requests the transition mode.

The second control unit 24 controls the second communication unit 23 such that the second communication unit 23 transmits to the measurement device 10 the correction value input by the user by the use of the input output device, while the measurement device 10 operates in the adjusting mode. The second control unit 24 judges that an update of the correction value has succeeded when a response (the updated correction value of the measurement device 10) is obtained from the measurement device 10 within a predetermined period from transmitting the correction value to the measurement device 10. The second control unit 24 judges that the update of the correction value has been failed when no response is obtained from the measurement device 10 within a predetermined period from transmitting the correction value to the measurement device 10. Alternatively, the second control unit 24 judges that the update of the correction value has been failed when the correction value obtained from the response is not identical to the correction value transmitted to the measurement device 10. The second control unit 24 informs users of a result indicating whether or not the update of the correction value has succeeded, by use of the input output device.

The second control unit 24 outputs to the input output device the detection signal which is input to the input terminal 211, while the measurement device 10 operates in the normal mode. The input output device displays the detection value of the measurement device 10 on the basis of the received detection signal from the management device 20.

Now referring to FIG. 4, the operation of the measurement device 10 is explained.

Before time t11, the electric potential of the power terminal 110 is the first potential Vd1 (=5V), and the detection signal is output to the output terminal 111. The first potential Vd1 (=5V) is not greater than the first threshold Vth1 (=6V), and an electric potential Vout of the detection signal is not greater than the second threshold Vth2 (=11V). Then, the judgment of the discriminating unit 16 indicates the normal mode. As a result, each of the back-gate of the switches Q12 and Q13 is connected to the power terminal 110. In this case, an electric potential of each of the back-gate of the switches Q12 and Q13 becomes the first potential Vd1 (=5V), and is greater than the electric potential Vout of the detection signal. Accordingly, unintended current do not flow through the switches Q12 and Q13.

Between time t11 and t12, the electric potential of the output terminal 111 is the second potential Vd2 (=12V), and the serial signal is output to the power terminal 110. The second potential Vd2 (=12V) is greater than the second threshold Vth2 (=11V). That is, the electric potential of the power terminal 110 is not less than the first threshold Vth1 while the electric potential of the output terminal 111 is not less than the second threshold Vth2. Then, the judgment of the discriminating unit 16 indicates the adjusting mode. As a result, each of the back-gate of the switches Q12 and Q13 is connected to the output terminal 111. In this case, the electric potential of each of the back-gate of the switches Q12 and Q13 becomes the second potential Vd2 (=12V), and is equal to the high level potential VSH of the serial signal. Accordingly, unintended current do not flow through the switches Q12 and Q13.

Between time t12 and t13, both of the electric potential of the power terminal 110 and the output terminal 111 are the transition potential Vt (=10V). That is, the electric potential of the power terminal 110 is not less than the first threshold Vth1 while the electric potential of the output terminal 111 is less than the second threshold Vth2. Then, the judgment of the discriminating unit 16 indicates the transition mode. As a result, each of the back-gate of the switches Q12 and Q13 is connected to the power terminal 110. In this case, the electric potential of each of the back-gate of the switches Q12 and Q13 becomes the transition potential Vt, and is equal to the electric potential of the output terminal 111. Accordingly, unintended current do not flow through the switches Q12 and Q13.

The management device 20 turns on the switch SW21 and off the switch SW22, after a lapse of the predetermined waiting time from requesting the transition mode (time t13). At this time, the second control unit 24 changes the electric potential of the feed unit 22 into the first potential Vd1 (=5V) after turning off the switch SW22 to open the output terminal 111.

After time t13, the judgment of the discriminating unit 16 indicates the normal mode. The electric potential of each of the back-gate of the switches Q12 and Q13 becomes the first threshold Vd1 because each of the back-gate of the switches Q12 and Q13 has been connected to the power terminal 110 in the transition mode (time t12 to t13). Since the electric potential of each of the back-gate of the switches Q12 and Q13 becomes greater than the electric potential Vout of the detection signal, unintended current do not flow through the switches Q12 and Q13.

Figures 5A, 5B:
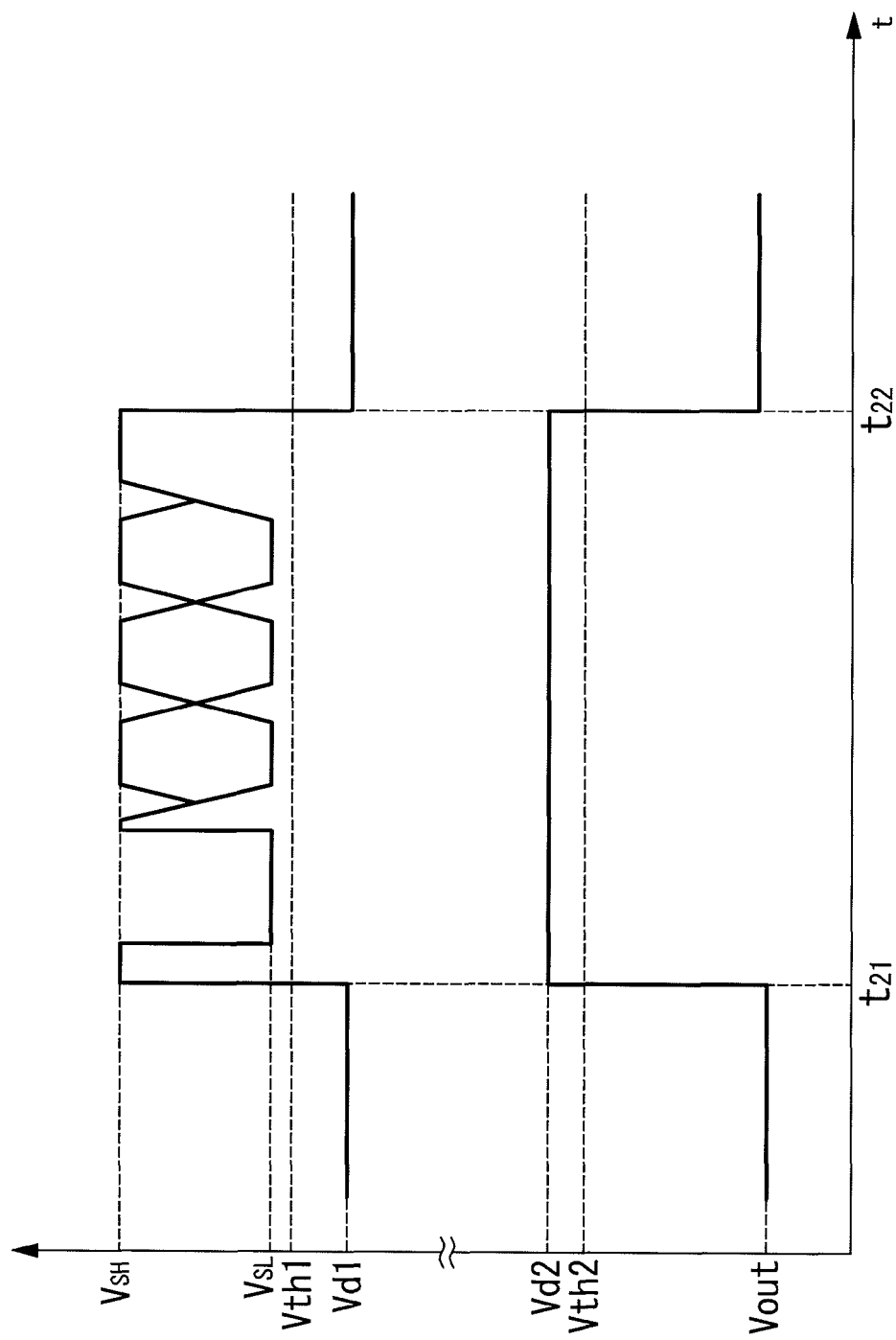
FIG. 5A shows a wave form chart illustrating an electric potential of a power terminal of a comparison example.
FIG. 5B shows a wave form chart illustrating an electric potential of an output terminal of a comparison example.

Next referring to FIG. 5, the operation of the measurement device 10 without the transition mode is explained.

Before time t21, the judgment of the discriminating unit 16 indicates the normal mode. As a result, each of the back-gate of the switches Q12 and Q13 is connected to the power terminal 110. Between time t21 and t22, the judgment of the discriminating unit 16 indicates the adjusting mode. As a result, each of the back-gate of the switches Q12 and Q13 is connected to the output terminal 111.

At time t22, a first problem is caused by turning off the switch SW22 (opening the output terminal 111) before changing the electric potential of the power terminal 110 to the first potential Vd1 in order to request to switch the operational mode to the normal mode from the adjusting mode. That is, the switch Q12 keeps the electric potential of the output terminal 111 to a value which is a little less than potential of the power terminal 110. As a result, the electric potential of the output terminal 111 is kept above the second threshold Vth2. Moreover, unintended current flows through the switch Q12.

At time t22, a second problem is caused by changing the electric potential of the power terminal 110 to the first potential Vd1 before opening the output terminal 111. That is, the electric potential of the output terminal 111 becomes higher than the electric potential of the power terminal 110. In this case, unintended current flows through the electric potential lowering circuit 152.

At time t22, a third problem is caused by changing both of the electric potential of the power terminal 110 and the output terminal 111 to the first potential Vd1 at the same time before opening the output terminal 111. That is, the judgment of the discriminating unit 16 indicates the normal mode when both of the electric potential of the power terminal 110 and the output terminal 111 become the first potential Vd1 at the same time. Therefore, the sensor 12 outputs the detection signal. In this case, undesired current flows because the electric potential of the detection signal collide against the electric potential applied by the feed unit 22 at the output terminal 111.

At time 22, a fourth problem is caused by changing the electric potential of the output terminal 111 to a value being lower than the first potential Vd1 initially. That is, each of the back-gate of the switches Q12 and Q13 becomes lower than the electric potential of the power terminal 110 because each of the back-gate of the switches Q12 and Q13 has been connected to the output terminal 111 in the adjusting mode. Accordingly, unintended current flows through the switches Q12 and Q13.

As described above, the measurement device 10 without the transition mode suffers from unintended current flowing through an electrical circuit of the measurement device 10.

However, in the measurement device 10 of the present embodiment, the operational mode is switched from the adjusting mode to the normal mode through the transition mode. In the transition mode, the N-type bulk (each of the back-gate of the switches Q12 and Q13) of the semiconductor elements is connected to the power terminal 110 which has the electric potential being not lower than the electric potential of the output terminal 111. Therefore, each of the back-gate of the switches Q12 and Q13 is not electrically conducted to drain or source of the switches Q12 and Q13 when the operational mode is switched to the normal mode from the adjusting mode. The measurement device 10 is capable of preventing unintended current from flowing through each of the back-gate of the switches Q12 and Q13.

The switching unit 18 connects each of the back-gate of the switches Q12 and Q13 to the power terminal 110 while the electric potential of the power terminal 110 becomes higher than the electric potential of the output terminal 111 (during the normal mode). Accordingly, in the switches Q12 and Q13, the N-type bulk is not electrically conducted to the P-type region. The switching unit 18 connects the back-gate (the N-type bulk) of the switches Q12 and Q13 to the output terminal 111 while the electric potential of the power terminal 110 becomes lower than the electric potential of the output terminal 111 (for example, between the normal mode and the switching mode, or during normal mode). Accordingly, in the switches Q12 and Q13, the N-type bulk is not electrically conducted to the P-type region.

As described above, the measurement device 10 of the present embodiment is capable of preventing unintended current from flowing through each of the back-gate of the switches Q12 and Q13 when the operational mode is switched.

In the measurement device 10 of the present embodiment, the first threshold Vth1 (=6V) of the discriminating unit 16 has a different value from the second threshold Vth2 (=11V). The discriminating unit 16 decides that the operational mode requested by the management device 20 is the adjusting mode, when the electric potential of the power terminal 110 is not less than the first threshold Vth1 while the output terminal 111 is not less than the second threshold Vth2. The discriminating unit 16 decides that the requested operational mode is the normal mode, when the electric potential of the power terminal 110 is less than the first threshold Vth1 while the output terminal 111 is less than the second threshold Vth2. The discriminating unit 16 decides that the requested operational mode is the transition mode, when the electric potential of the power terminal 110 is not less than the first threshold Vth1 while the output terminal 111 is less than the second threshold Vth2.

In the measurement device 10 of the present embodiment, both of the electric potentials of the power terminal 110 and the output terminal 111 in the normal mode can be clearly distinguished from the electric potential of the power terminal 110 and the electric potential of the output terminal 111 in the transition mode, respectively. The measurement device 10 is capable of switching the operational mode from the adjusting mode to the transition mode successfully. Moreover, a condition for switching the operational mode is set by only defining the first threshold Vth1 and the second threshold Vth2 properly. Therefore, the measurement device 10 does not require any additional circuit for including the transition mode.

The measurement device 10 of the present embodiment discriminates the operational mode requested by the management device 20 based on whether or not the electric potential (changes in potential) of each of the power terminal 110 and the output terminal 111 satisfies the predetermined condition. Accordingly, it is unnecessary to increase the number of the terminal of the first terminal unit 11 in order to switch to the adjusting mode. Moreover an accuracy of the judging the operational mode is improved than the measurement device 10 discriminates the requested operational mode based on whether or not the electric potential (changes in potential) of any one of the power terminal 110 and the output terminal 111 satisfies the predetermined condition. Therefore, unexpected switching of the operational mode is prevented. The management device 20 has the input terminal 211 corresponding to each of the measurement device 10. The management device 20 is able to select the measurement device 10 which the management device 20 requests to switch to the adjusting mode, by means of changing the electrical potential of the output terminal 111. The management device 20 is capable of designating the measurement device 10 without including the ID of the measurement device 10 in the serial signal.

In the measurement device 10 of the present embodiment, the feeder wire 30 is available as a communication wire because the power terminal 110 is used for communicating with the management device 20 in the adjusting mode. It is unnecessary to provide a plurality of the second communication unit 23 corresponding to a plurality of the measurement device 10 to the management device 20, because the second communication unit 23 is able to communicate with each of the measurement devices 10. Therefore, the measurement device 10 is able to simplify the management device 20. The measurement device 10 can have a reduced high-frequency noise less than when the measurement device 10 communicates with the management device 20 by use of the output terminal 111, because the power terminal 110 is grounded through the bypass capacitor C11.

The measurement device 10 includes the power supply unit 19 configured to generate the drive voltage for activating the measurement device 10. The management device 20 is configured to energize the measurement device 10 through the power terminal 111 while the management device 20 requests the normal mode, and is configured to energize the measurement device 10 through the output terminal 111 while the management device 20 requests the adjusting mode. The power supply unit 19 is configured to generate the drive voltage by use of power received from the management device 20 via the power terminal 110 in the normal mode, and is configured to generate the drive voltage by use of power received from the management device 20 via the output terminal 111 in the adjusting mode.

That is, in the adjusting mode, the power supply unit 19 generates the drive voltage on the basis of not the power terminal 110 having an unstable potential caused by the serial signal but the output terminal 111 having a stable potential. Accordingly, the measurement device 10 is able to operate stably.

In the measurement device 10 according to the present embodiment, the first communication unit 15 is configured to change the electrical potential of the serial signal to be transmitted to the management device 20 into high-level by short circuiting between the output terminal 111 and the power terminal 110. That is, the electric potential of the output terminal 111 in the adjusting mode is used as the high level potential of the serial signal to be transmitted to the management device 20. The electric potential of the output terminal 111 lowered by the electric potential lowering circuit 152 in the adjusting mode is used as the low level potential of the serial signal to be transmitted to the management device 20. Accordingly, it is suppressed that the electric potential (the high level potential and the low level potential) of the serial signal is varied by a variation of resistances of electrical components composing the measurement device 10. Accuracy of serial communications between the measurement device 10 and the management device 20 is improved.

Now referring to FIG. 6, in the switching unit 18, the switches QP3 and QP4, the resistor RP2, and the inverter 181 may be omitted. In this case, each of the back-gate of the switches Q12 and Q13 is connected to the power terminal 110 through the resistor R13 while the switch QP2 is turned off. Each of the back-gate of the switches Q12 and Q13 is connected to the output terminal 111 through the switch QP1 while the switch QP2 is turned on.

That is, each of the back-gate of the switches Q12 and Q13 is connected to the power terminal 110 through the resistor R13. However, in FIG. 3, each of the back-gate of the switches Q12 and Q13 is connected to the power terminal 110 through the switch QP3. The switch QP3 has its on-resistance which is enough smaller than resistance of the resistor R13. For example, the on-resistance of the switch QP3 is n the range of tens to hundreds of ohms. Therefore, each of the back-gate of the switches Q12 and Q13 is connected to the power terminal 110 through a low-resistance element (a low-impedance element) having lower resistance than the resistor R13. In a noisy environment, the electric potential of the N-type bulk (each of the back-gate of the switches Q12 and Q13) becomes more stable than each of the back-gate of the switches Q12 and Q13 is connected to the power terminal 110 through the resistor R13.

In the present embodiment, the transition potential Vt applied to the power terminal 110 is identical to the transition potential Vt applied to the output terminal 111. However, the management device 20 is configured to apply to the power terminal 110 a first transition potential being not less than the power potential and to apply to the output terminal 111 a second transition potential being not greater than the first transition potential, while the management device 20 requests the transition mode. The feed unit 22 may include a plurality of a power source having a different potential each other instead of the step-down chopper for varying an electric potential. The measurement device 10 may have a plurality of the adjusting mode and a plurality of the normal mode, and the number of the transition mode is able to be increased in accordance with increasing the number of the adjusting mode or the normal mode. The transmission circuit may be omitted from the first communication unit 15 of the measurement device 10. In this case, the management device 20 is configured to judge whether the correction value has been updated or not, on the basis of the electric potential of the output terminal 111 at the time of the normal mode.

Moreover, the measurement device 10 may have an integrated circuit composed of a monolithic integrated circuit which includes the first terminal unit 11, the storage unit 13, the output unit 14, the first communication unit 15, the discriminating unit 16, the first control unit 17, the switching unit 18, and the power supply unit 19. Above-mentioned integrated circuit includes the electrical components of the measurement device 10 except the sensor 12. This is capable of downsizing the measurement device 10. When the sensor 12 is an acceleration sensor produced by use of MEMS technology, the integrated circuit is able to further include the sensor 12. When the sensor 12 is a magnetic sensor composed of a hall element and its detection circuit, the integrated circuit is able to further include the detection circuit of the sensor 12.

2nd Embodiment

Figure 7:
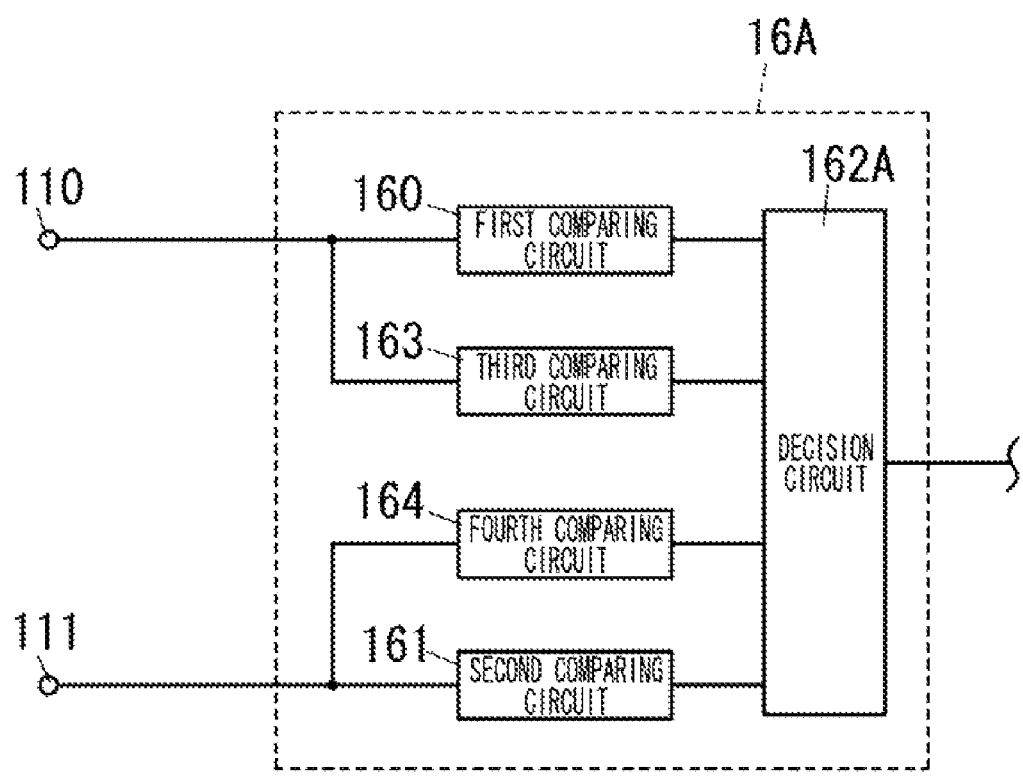
FIG. 7 shows a block diagram illustrating a discriminating unit of a physical quantity measurement device of a 2nd embodiment.

Now referring to FIG. 7, an explanation is made to a measurement device 10 according to the second embodiment of the present invention which is basically identical to the first embodiment except for inclusion of an associated modification of the discriminating unit 16A. Like parts are designated by like reference numerals optionally with a suffix letter of "A", and no duplication explanation is deemed necessary.

The discriminating circuit 16A includes a third comparing circuit 163 and a fourth comparing circuit 164 in addition to the first comparing circuit 160, the second comparing circuit 161, and the decision circuit 162A.

The third comparing circuit 163 is configured to compare the electric potential of the power terminal 110 to a third threshold Vth3. The fourth comparing circuit 164 is configured to compare the electric potential of the output terminal 111 to the third threshold Vth3. Each of the comparing circuits 163 and 164 is composed of a comparator.

The third threshold Vth3 is greater than the first threshold Vth1 and the second threshold Vth2.

The decision circuit 162A decides that the requested operational mode is the adjusting mode when the electric potential of the power terminal 110 is not less than the first threshold Vth1 and less than the third threshold Vth3 while the electric potential of the output terminal 111 is not less than the second threshold Vth2 and less than the third threshold Vth3. The decision circuit 162A decides that the requested operational mode is the normal mode when the electric potential of the power terminal 110 is less than the first threshold Vth1 while the electric potential of the output terminal 111 is less than the second threshold Vth2. The decision circuit 162A decides that the requested operational mode is the transition mode when both of the electric potential of the power terminal 110 and the output terminal 111 are not less than the third threshold Vth3.

In the present embodiment, the first threshold Vth1 is 6V, and the second threshold Vth2 is 11V, and the third threshold Vth3 is 13V. In accordance with this modification, in the management device 20 of the present embodiment, the transition potential Vt of the feed unit 22 is 12V.

Figure 8:
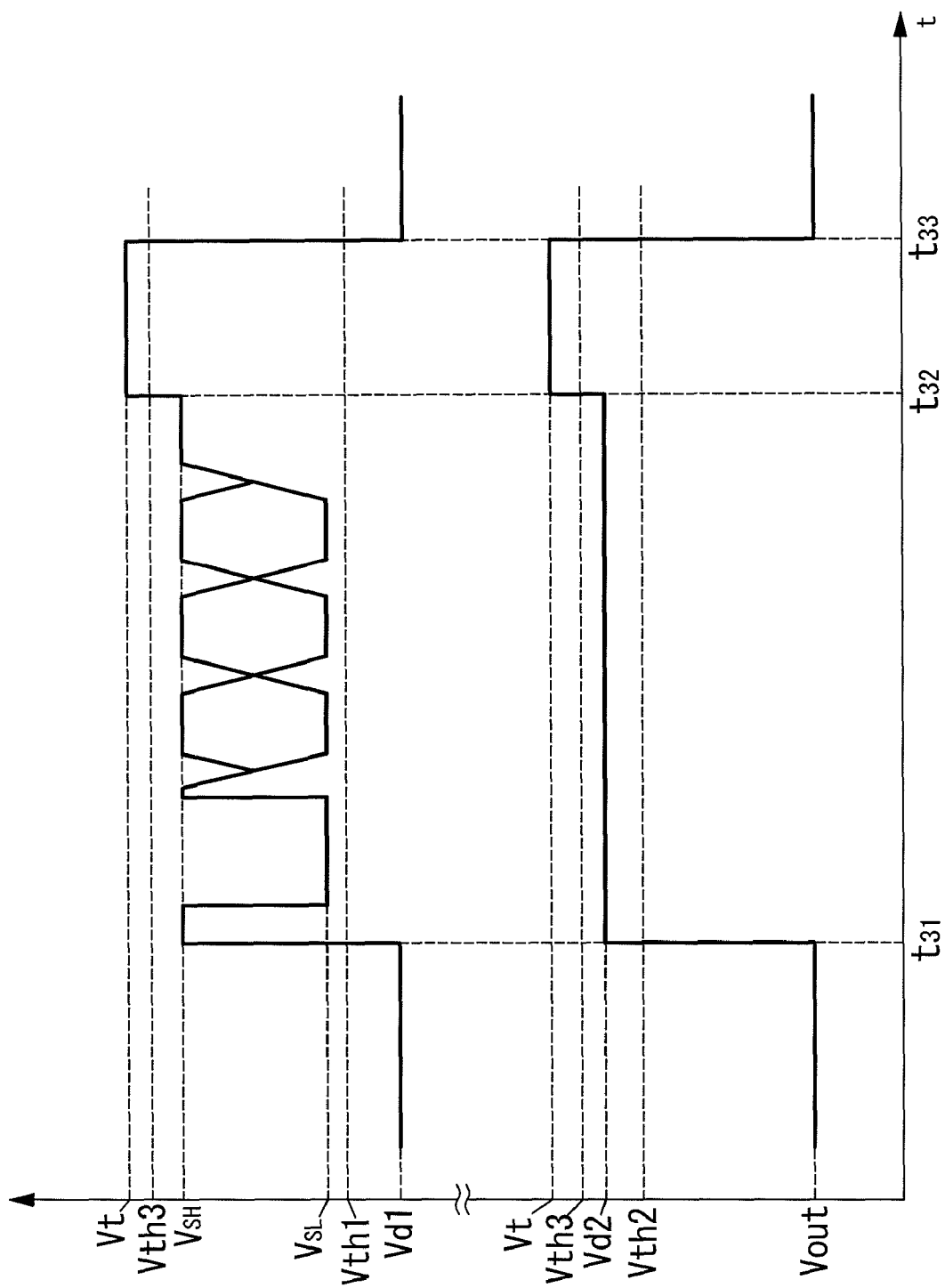
FIG. 8A shows a wave form chart illustrating an electric potential of a power terminal of the above physical quantity measurement device.
FIG. 8B shows a wave form chart illustrating an electric potential of an output terminal of the above physical quantity measurement device.

Next referring to FIG. 8, the operation of the measurement device 10 is explained.

Before time t31, the electric potential of the power terminal 110 becomes the first potential Vd1 (=5V), and the detection signal is output to the output terminal 111. Then, the judgment of the discriminating unit 16A indicates the normal mode. As a result, each of the back-gate of the switches Q12 and Q13 is connected to the power terminal 110.

Between time t31 and t32, the electric potential of the output terminal 111 becomes the second potential Vd2 (=12V), and the serial signal is output to the power terminal 110. Then, the judgment of the discriminating unit 16A indicates the adjusting mode. As a result, each of the back-gate of the switches Q12 and Q13 is connected to the output terminal 111.

Between time t32 and t33, both of the electric potential of the power terminal 110 and the output terminal 111 become the transition potential Vt (=14V). The transition potential Vt is higher than the third threshold Vth3 (=13V). Then, the judgment of the discriminating unit 16A indicates the transition mode. As a result, each of the back-gate of the switches Q12 and Q13 is connected to the power terminal 110.

After time t33, the electric potential of the power terminal 110 becomes the first potential Vd1, and the detection signal is output to the output terminal 111. Then, the judgment of the discriminating unit 16A indicates the normal mode. Each of the back-gate of the switches Q12 and Q13 has been connected to the power terminal 110 in the transition mode. Accordingly, the electric potential of each of the back-gate of the switches Q12 and Q13 becomes the first threshold Vd1. In this case, since each of the electric potential of the back-gate of the switches Q12 and Q13 becomes higher than the electric potential Vout of the detection signal, unintended current does not flow through the switches Q12 and Q13.

As described above, the measurement device 10 of the present embodiment is capable of preventing unintended current from flowing through the switches Q12 and Q13.

Moreover, in the measurement device 10 of the present embodiment, the third threshold Vth3 (=13V) is greater than the first threshold Vth1 (=5V) and the second threshold Vth2 (=12V). Further, the discriminating unit 16A decides that the requested operational mode is the adjusting mode when the electric potential of the power terminal 110 is not less than the first threshold Vth1 and less than the third threshold Vth3 while the electric potential of the output terminal 111 is not less than the second threshold Vth2 and less than the third threshold Vth3. The discriminating unit 16A decides that the requested operational mode is the normal mode when the electric potential of the power terminal 110 is less than the first threshold Vth1 while the electric potential of the output terminal 111 is less than the second threshold Vth2. The discriminating unit 16A decides that the requested operational mode is the transition mode when both of the electric potential of the power terminal 110 and the output terminal 111 are not less than the third threshold Vth3.

In the measurement device 10 of the present embodiment, both of the electric potentials of the power terminal 110 and the output terminal 111 in the normal mode can be clearly distinguished from the electric potential of the power terminal 110 and the electric potential of the output terminal 111 in the transition mode, respectively. The measurement device 10 is capable of switching the operational mode from the adjusting mode to the transition mode successfully.

3rd Embodiment

An explanation is made to a measurement device 10 according to the third embodiment of the present invention which is basically identical to the first embodiment except for inclusion of an associated modification of the discriminating unit 16. Moreover, an explanation is made to a management device 20 mentioned in the third embodiment which is basically identical to the management device 20 mentioned in the first embodiment except for inclusion of an associated modification of the second control unit 24. Like parts are designated by like reference numerals, and no duplication explanation is deemed necessary.

The second control unit 24 mentioned in the present embodiment is configured to control the second communication unit 23 such that the second communication unit 23 sends an instruction signal to the measurement device 10. The instruction signal is used for instructing the measurement device 10 to switch the operational mode to the transition mode. The second control unit 24 is configured to request the measurement device 10 to switch the operational mode to the normal mode from the adjusting mode through the transition mode upon receiving the instruction, which indicates switching the operational mode from the adjusting mode to the normal mode, from the input output device. That is, the second control unit 24 turns on the switches SW21 and SW22 at first. The second control unit 24 further changes the electric potential of the feed unit 22 into the transition potential Vt and controls the second communication unit 23 such that the second communication unit 23 sends the instruction signal to the measurement device 10. After a lapse of predetermined waiting time, the second control unit 24 turns on the switch SW21 and turns off the SW 22. The second control unit 24 further changes the electric potential of the feed unit 22 into the first potential Vd1.

The management device 20 is configured to apply the transition potential Vt to both of the power terminal 110 and the output terminal 111 and to output the instruction signal to the power terminal 110 of the measurement device 10 through the feed unit 210, while the management device 20 requests the transition mode. After a lapse of the predetermined waiting time from requesting the transition mode, the management device 20 turns off the switch SW22 to open the output terminal 111 and then changes the electric potential of the feed unit 22 into the first potential Vd1 (=5V).

The discriminating unit 16 of the present embodiment is configured to decide that the requested operational mode is the transition mode, when the first communication unit 15 receives the instruction signal.

In the measurement device 10 of the present embodiment, it is unnecessary to decide whether the transition mode is requested or not, on the basis of both of the electric potential of the power terminal 110 and the output terminal 111. As a result, the measurement device 10 is capable of switching the operational mode from the adjusting mode to the transition mode successfully.

4th Embodiment

Figure 9:
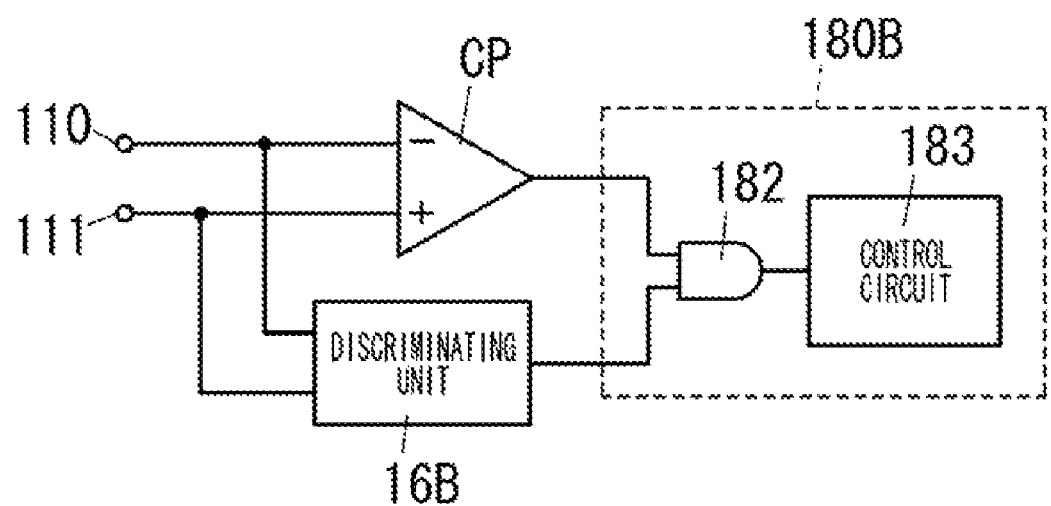
FIG. 9 shows a partial block diagram illustrating a physical quantity measurement device of a 4th embodiment.
Figure 10:
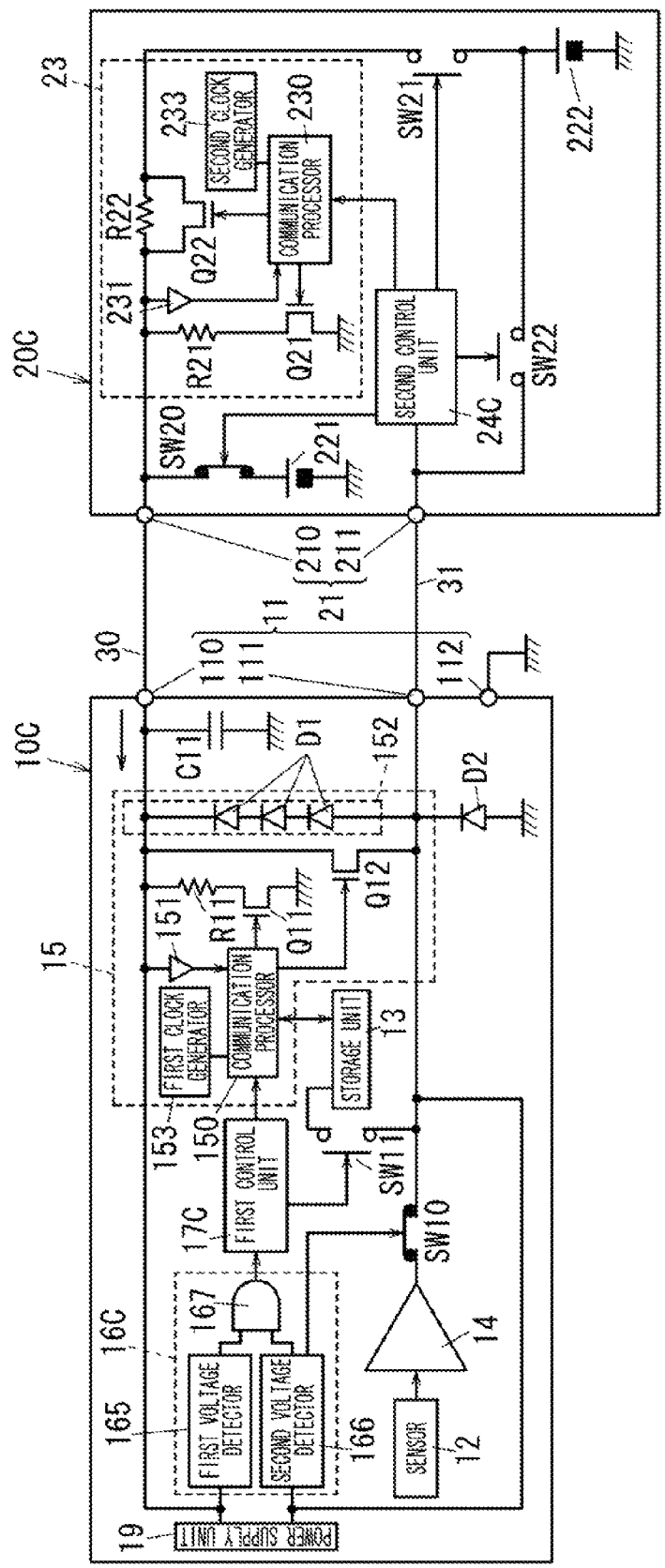
FIG. 10 shows a block diagram illustrating a physical quantity detecting system involving a physical quantity measurement device of a 5th embodiment.

Now referring to FIG. 9, an explanation is made to a measurement device 10 according to the fourth embodiment of the present invention which is basically identical to the first embodiment except for inclusion of an associated modification of the discriminating unit 16B, the switching unit 18, and the comparing unit CP. Moreover, an explanation is made to a management device 20 mentioned in the fourth embodiment which is basically identical to the management device 20 mentioned in the first embodiment except for inclusion of an associated modification of the second control unit 24. Like parts are designated by like reference numerals optionally with a suffix letter of "B", and no duplication explanation is deemed necessary.

The measurement device 10 of the present embodiment has the adjusting mode and the normal mode except for the transition mode, as the operational mode.

The management device 20 mentioned in the present embodiment is configured to apply the first potential Vd1 to the power terminal 110 while the management device 20 requests the normal mode, and to apply the second potential Vd2 to the output terminal 111 while the management device 20 requests the adjusting mode.

The discriminating unit 16B has the first comparing circuit 160, the second comparing circuit 161, and the decision circuit 162.

The decision circuit 162 on the present embodiment decides that the operational mode requested by the management device 20 is the adjusting mode when the electric potential of the power terminal 110 is not less than the first threshold Vth1 while the electric potential of the output terminal 111 is not less than the second threshold Vth2. The decision circuit 162 decides that the requested operational mode is the normal mode when the electric potential of the power terminal 110 is less than the first threshold Vth1 while the electric potential of the output terminal 111 is less than the second threshold Vth2.

The discriminating unit 16B sends own judgment to the first control unit 17 and the switching unit 18. Especially, the discriminating unit 16B sends a judgment signal indicating judgment of the discriminating unit 16B to the switching unit 18. The judgment signal has a high level potential while the judgment indicates the adjusting mode, and has a low level potential while the judgment indicates the normal mode.

The comparing unit CP is configured to compare the electric potential of the power terminal 110 to the electric potential of the output terminal 111. The comparing unit CP is, for example, composed of a comparator. The comparing unit CP outputs a comparing signal indicating a comparison result of the comparing unit CP. The comparing signal has a high level potential when the output terminal 111 has higher electrical potential than the power terminal 110, and has a low level potential when the output terminal 111 has not higher potential than the power terminal 110.

The switching unit 18 is configured to connect each of the back-gate of the switches Q12 and Q13 to the power terminal 110 or the output terminal 111 in accordance with the judgment provided by the discriminating unit 16 and the comparison result provided by the comparing unit CP. The switching unit 18 of the present embodiment is different in the switching control circuit 180B from the switching unit 18 of the first embodiment.

The switching control circuit 180B has an AND circuit 182 and a control circuit 183.

The AND circuit 182 calculates logical conjunction of the judgment signal and the comparing signal and then outputs an output signal indicating a calculation result of logical conjunction. The output signal indicates a high level only when the output terminal 111 has higher potential than the power terminal 110 while the judgment of the discriminating circuit 16 indicates the adjusting mode. That is, the output signal indicates a low level, when the output terminal 111 has not higher potential than the power terminal 110, or when the judgment of the discriminating circuit 16 indicates the normal mode.

The control circuit 183 is configured to output a high level control signal from its control terminal when the output signal from the AND circuit 182 indicates the high level. As a result, each of the back-gate of the switches Q12 and Q13 is connected to the output terminal 111 through the switch QP1.

The control circuit 183 is configured to output a low level control signal from the control terminal when the output signal from the AND circuit 182 indicates the low level. As a result, each of the back-gate of the switches Q12 and Q13 is connected to the power terminal 110 through the switch QP3.

As described above, the switching unit 18 connects each of the back-gate of the switches Q12 and Q13 to the power terminal 110 when the judgment of the discriminating unit 16B indicates the normal mode. The switching unit 18 connects each of the back-gate of the switches Q12 and Q13 to one having the highest potential among the power terminal 110 and the output terminal 111 on the basis of the comparison of the comparing unit CP when the judgment of the discriminating unit 16B indicates the adjusting mode.

In the measurement device 10 of the present embodiment, each of the back-gate of the switches Q12 and Q13 is connected to one having the highest potential among the power terminal 110 and the output terminal 111 in the adjusting mode. In the switches Q12 and Q13, the electric potential of the back-gate is kept above the electric potential of the source and drain, when the operational mode switches to the normal mode from the adjusting mode. Accordingly, the measurement device 10 of the present embodiment is capable of preventing unintended current from flowing through the switches Q12 and Q13.

5th Embodiment

The measurement device 10C of the 5th embodiment includes the first terminal unit 11, the sensor 12, the storage unit 13, the output unit 14, the first communication unit 15, the discriminating unit 16C, the first control unit 17C, and the power supply unit 19. Like parts are designated by like reference numerals optionally with a suffix letter of "C", and no duplication explanation is deemed necessary.

The discriminating circuit 16C has a first voltage detector 165, a second voltage detector 166, and an AND circuit 167.

The first voltage detector 165 is an overvoltage detector configured to detect the electric potential of the power terminal 110 which exceeds a predetermined first detection potential (for example 6V). The first voltage detector 165 is configured to output a high level first signal to the AND circuit 167 when the electric potential of the power terminal 110 exceeds the first detection potential (=6V), and to output a low level first signal to the AND circuit 167 when the electric potential of the power terminal 110 is less or equal to the first detection potential. The second voltage detector 166 is an overvoltage detector configured to detect the electric potential of the output terminal 111 which exceeds a predetermined second detection potential (for example 6V). The second voltage detector 166 is configured to output a high level second signal to the AND circuit 167 when the electric potential of the output terminal 111 exceeds the second detection potential (=6V), and to output the low level second signal to the AND circuit 167 when the electric potential of the output terminal 111 is less or equal to the second detection potential. Each of the voltage detectors 165 and 166 is composed of a comparator.

The second signal of the second voltage detector 166 is further output to a switch SW10. The switch SW10 is connected between the output unit 14 and the output terminal 111. The switch SW10 is configured to be turned on when the second voltage detector 166 outputs the low level second signal, and to be turned off when the second voltage detector 166 outputs the high level second signal. Accordingly, the switch SW10 is capable of preventing high voltages from being applied to the output unit 14, and is capable of increasing an impedance of the output terminal 111.

The AND circuit 167 is configured to output a high level third signal both of the first control unit 17C and the power supply unit 19, during receiving the high level first signal and the high level second signal. The AND circuit 167 is configured to output a low level third signal both of the first control unit 17C and the power supply unit 19, while the AND circuit receives the low level first signal or the low level second signal. The discriminating unit 16C discriminates the operational mode requested by the management device 20 based on whether or not the electric potential (changes in potential) of each of the power terminal 110 and the output terminal 111 satisfies the predetermined condition.

The first control unit 17C has two operational modes, the normal mode and the adjusting mode. The first control unit 17C operates in the adjusting mode upon receiving the high level third signal from the AND circuit 167, and operates in the normal mode upon receiving the low level third signal from the AND circuit 167.

The first control unit 17C turns off a switch SW11 in the normal mode, and turns on the switch SW11 in the adjusting mode. That is, in the adjusting mode, a voltage for writing the correction value in the storage unit 13 is applied to the storage unit 13. The measurement device 10 is capable of writing the correction value in the storage unit 13 and is capable of rewriting the correction value stored in the storage unit 13, even when the storage unit 13 is a storage device (such as an EEPROM) requiring a comparatively high voltage for data writing. Accordingly, the measurement device 10 does not require a step-up chopper used for applying a high voltage to the storage unit 13. The measurement device 10 is capable of being downsized and is capable of lowering its production costs. The other behaviors of the first control unit 17C are identical to the first control unit 17 of the first embodiment.

The management device 20C includes the second terminal unit 21, a first feed unit 221, a second feed unit 222, the second communication unit 23, and the second control unit 24C. Like parts are designated by like reference numerals optionally with a suffix letter of "C", and no duplication explanation is deemed necessary.

The first feed unit 221 is used in the normal mode. The first feed unit 221 has its output potential of 5V. The first feed unit 221 is connected to the feed terminal 210 through a switch SW20. The second feed unit 222 is used in the adjusting mode. The second feed unit 222 has its output potential of 12V. The second feed unit 222 is connected to the feed terminal 210 through a switch SW21, and is connected to the input terminal 211 through a switch SW22. The switches SW20, SW21, and SW22 are, for example, relays, and are controlled by the second control unit 24C.

The second control unit 24C turns on the switch SW20, and turns off the switches SW21 and SW22, when the second control unit 24C requests the normal mode to the measurement device 10C. Then, the second feed unit 222 is disconnected from the feed terminal 210, and the first feed unit 221 is connected to the feed terminal 210. As a result, the electric potential of the power terminal 110 of the measurement device 10C changes into 5V.

The second control unit 24C turns off the switch SW20, and turns on the switches SW21 and SW22, when the second control unit 24C requests the adjusting mode to the measurement device 10C. Then, the first feed unit 221 is disconnected from the feed terminal 210, and the second feed unit 222 is connected to both of the feed terminal 210 and the input terminal 211. As a result, both of the electric potential of the power terminal 110 and the output terminal 111 of the measurement device 10C change into 12V. However, the resistor R22 lowers the electric potential of the power terminal 110 in accordance with its resistance, while the switch Q22 is turned off.

The other behaviors of the second control unit 24C are identical to the second control unit 24 of the first embodiment.

Figure 11:
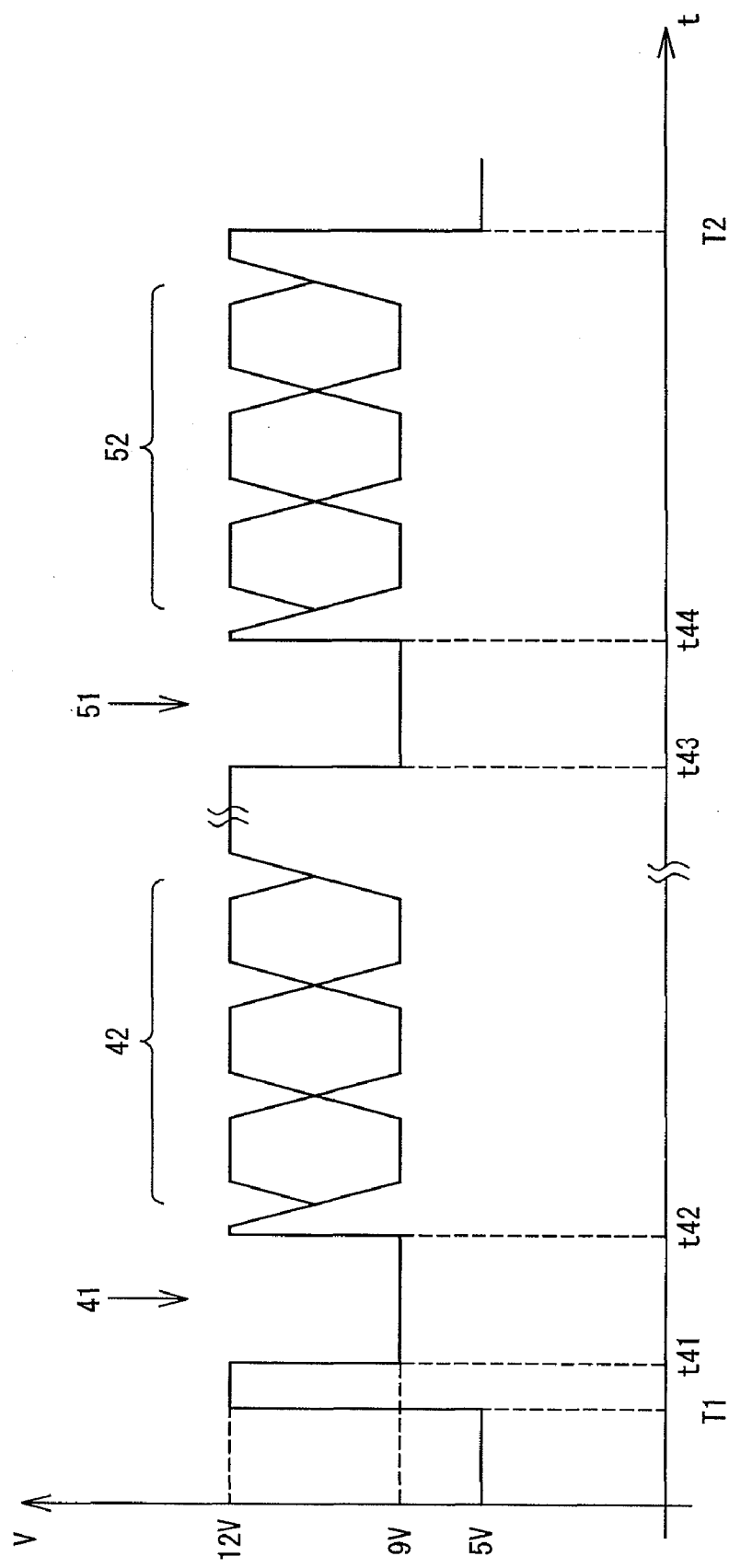
FIG. 11 shows a diagram illustrating serial communication between the physical quantity measurement device and the external device.

Now referring to FIG. 11, the operation of the physical quantity detecting system employing the measurement device 10C is explained. FIG. 11 illustrates changes in the electric potential of the power terminal 110.

Before time T1 in FIG. 11, the measurement device 10C operates in the normal mode.

When the adjusting mode is selected by use of the input output device, the second control unit 24C turns off the switch SW20, and turns on the switches SW21 and SW22. Each of the power terminal 110 and the output terminal 111 of the measurement device 10C receives an electric potential of 12V. Since the first voltage detector 165 outputs the high level first signal while the second voltage detector 166 outputs the high level second signal, the AND circuit 167 outputs the high level third signal. As a result, the measurement device 10C starts to operate in the adjusting mode. Actually, the electric potential of the power terminal 110 becomes an electric potential obtained by subtracting from 12V a voltage drop of the resistor R22 caused by a consumption current of the measurement device 10C. However, in the below-mentioned explanation, the consumption current is not taken into consideration in order to simplify explanations.

When a user inputs the correction value by use of the input output device, the second control unit 24C controls the second communication unit 23 such that the second control unit 23 transmits a correction data indicating the input correction value.

The correction data is three bytes of data. The correction data is, for example, composed of two bytes of data indicating the correction value (one byte of data indicating the offset value and one byte of data indicating the gain value), and one byte of data indicating a production ID of the measurement device 10C.

The second communication unit 23 transmits the serial signal in such a manner that the second communication unit 23 transmits a start bit 41 by setting the electric potential of the feed unit 210 to 9V for a predetermined period (time t41 to t42) and subsequently transmits a bit sequence DB1 indicating the correction data. Moreover, the second communication unit 23 transmits a stop bit (not shown) to notify the measurement device 10C that the second communication unit 23 has accomplished transmitting the serial signal, after transmission of the bit sequence DB1.

The first control unit 17C checks whether or not the production ID included in the correction data is identical to own production ID, upon receiving the correction data at the first communication unit 15. When the production ID included in the received correction data is identical to own production ID, the first control unit 17C updates the correction value stored in the storage unit 13 to the received correction value from the management device 20C. By contrast, when the production ID included in the received correction data is not identical to own production ID, the first control unit 17C discards the received correction data.

After the correction value is updated, the first control unit 17C controls the first communication unit 15 such that the first control unit 15 transmits a response data. The response data is three bytes of data. The response data is, for example, composed of two bytes of data indicating the updated correction value and one byte of data indicating the production ID of the measurement device 10C. The first communication unit 15 transmits the serial signal in such a manner that the first communication unit 15 transmits a start bit 51 by setting the electric potential of the power unit 110 to 9V for a predetermined period (time t43 to t43) and subsequently transmits a bit sequence 52 indicating the correction data. Moreover, the first communication unit 15 transmits a stop bit (not shown) to notify the management device 20C that the first communication unit 15 has accomplished transmitting the serial signal, after transmission of the bit sequence 52.

The second control unit 24C checks whether or not both of the correction value and the production ID included in the response data are identical to both of the correction data and the production ID included in the transmitted correction data to the measurement device 10C, upon receiving the response data at the second communication unit 23. When both of the correction value and the production ID included in the received response data are identical to both of the correction value and the production ID included in the transmitted correction data to the measurement device 10C, the second control unit 24C judges that an update of the correction value has succeeded. When the correction value included in the received response data is not identical to the correction value included in the transmitted correction data to the measurement device 10C, or when the production ID included in the received response data is not identical to the production ID included in the transmitted correction data to the measurement device 10C, the second control unit 24C judges that the update of the correction value has failed. The second control unit 24C informs users of a result indicating whether or not the update of the correction value has succeeded, by use of the input output device.

When the normal mode is selected by use of the input output device, the second control unit 24C turns on the switch SW20, and turns off the switches SW21 and SW22. The power terminal 110 of the measurement device 10C receives an electric potential of 5V. Since the first voltage detector 165 outputs the low level first signal, the AND circuit 167 outputs the low level third signal. Accordingly, the first control unit 17C operates in the normal mode.

The measurement device 10C of the present embodiment discriminates the operational mode requested by the management device 20C based on whether or not the electric potential (changes in potential) of each of the power terminal 110 and the output terminal 111 satisfies the predetermined condition. Accordingly, it is unnecessary to increase the number of the terminal of the first terminal unit 11 in order to switch to the adjusting mode. Moreover an accuracy of the judging the operational mode is improved than the measurement device 10C discriminates the requested operational mode based on whether or not the electric potential (changes in potential) of any one of the power terminal 110 and the output terminal 111 satisfies the predetermined condition. Moreover, the management device 20C is able to select the measurement device 10C which the management device 20C requests to switch to the adjusting mode, by use of the output terminal 111.

In the measurement device 10C of the present embodiment, the feeder wire 30 is available as a communication wire because the power terminal 110 is used for communicating with the management device 20C in the adjusting mode. It is unnecessary to provide a plurality of the second communication unit 23 corresponding to a plurality of the measurement device 10C to the management device 20C. Therefore, the measurement device 10C is able to simplify the management device 20C.

In the adjusting mode, the power supply unit 19 generates the drive voltage on the basis of not the power terminal 110 having an unstable potential caused by the serial signal but the output terminal 111 having a stable potential. Accordingly, the measurement device 10C is able to operate stably.

The measurement device 10C is capable of simplifying a procedure which the management device 20C executes for switching the operational mode of the measurement device 10C, because the measurement device 10C judges the requested operational mode based on the management device 20C changes the terminal used for supplying power.

The first control unit 17C writes the correction value in the storage unit 13 by use of the electric potential of the output terminal. Accordingly, the measurement device 10C never suffers from a voltage drop of a current-limiting resistor (the resistor R22) connecting to the power terminal 110. Therefore, the measurement device 10C is able to obtain a required voltage for writing data in nonvolatile memories. The measurement device 10C is capable of writing successfully the correction value in the storage unit 13, even when the storage unit 13 is the nonvolatile memory.

It is noted that the discriminating unit 16C may discriminate the operational mode based on whether the electric potential of the power terminal 110 or the output terminal 111 changes in a predetermined pattern, such as a predetermined number of times and a predetermined frequency. That is, the discriminating unit 16C is configured to discriminate the operational mode on the basis of an electric potential waveform (an electric potential change) of the power terminal 110 or the output terminal 111.

Alternatively, the discriminating unit 16C is configured to discriminate the operational mode requested by the management device 20C based on whether or not the electrical potential of each of the power terminal 110 and the output terminal 111 satisfies the predetermined condition for a predetermined time period. In this modification, accuracy of discriminating the operational mode is improved, and therefore the measurement device 10C is free from unexpected switching of the operational mode due to such noise.

Besides, the discriminating unit 16C is configured to discriminate the requested operational mode based on whether or not at least one of the electrical potential of the power terminal 110 and the output terminal 111 satisfies the predetermined condition.

Moreover, the measurement device 10C may have an integrated circuit. The integrated circuit includes the first terminal unit 11, the storage unit 13, the output unit 14, the first communication unit 15, the discriminating unit 16C, the first control unit 17C, and the power supply unit 19.

Above-mentioned integrated circuit includes a semiconductor element as a circuit element. In the case of the integrated circuit being a monolithic IC, semiconductor switching devices such as transistors are used as switches. Diffused resistors formed by injecting impurities to bulks are used as resistors. The monolithic IC employs such as PNP bipolar transistors, P-channel MOSFETs, and diffused resistors.

Above-mentioned semiconductor element has an N-type bulk and a P-type region formed in the N-type bulk. In this semiconductor element, it is required that an electric potential of the N-type bulk is kept above an electric potential of the P-type region, in order to prevent the N-type bulk from being electrically conducted to the P-type region. Accordingly, the N-type bulk is connected to the highest potential point, for instance, the power terminal 110 of the measurement device 10C.

However, in the present embodiment, the management device 20C connects the first feed unit 221 having the output potential of 5V to the power terminal 110 at the time of requesting the normal mode, and connects the second feed unit 222 having the output potential of 12V to the power terminal 110 at the time of requesting the adjusting mode.

Therefore, in the measurement device 10C, the power terminal 110 is likely to have lower potential than the output terminal 111, when the operational mode is switched from the normal mode to the adjusting mode, or when the operational mode is the adjusting mode.

When the switch Q12 is a four-terminal P-channel MOSFET, the switch Q12 has its bulk (its back-gate) and drain connected to the power terminal 110, and its source connected to the output terminal 111. When the power terminal 110 has lower potential than the output terminal 111, source and bulk of the switch Q12 are short-circuited. In this case, an over current is likely to flow through the switch Q12. The power terminal 110 is likely to be given an electric potential which is lowered by a P-N junction of the switch Q12 instead of the voltage lowering circuit 152.

Figure 12:
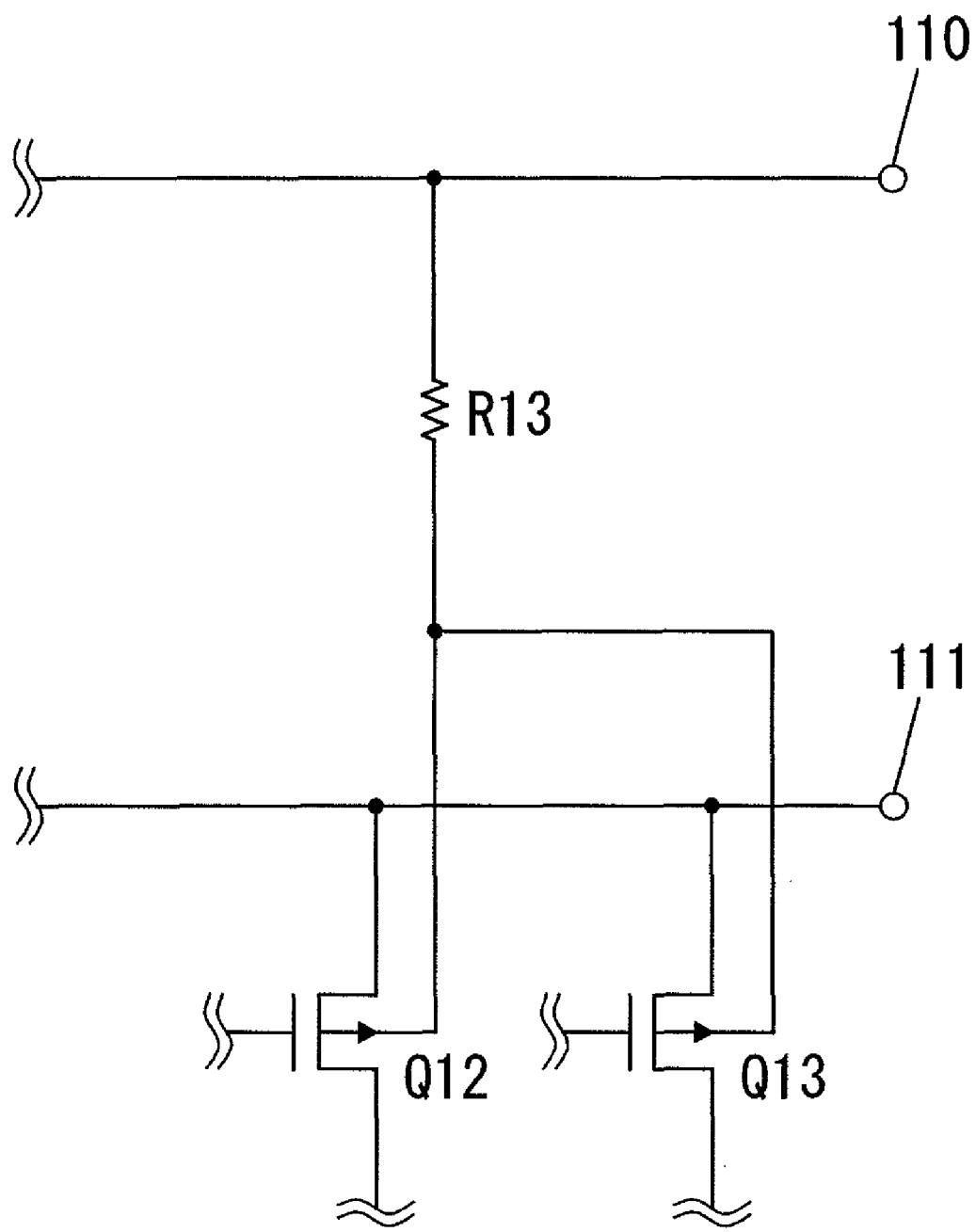
FIG. 12 shows a diagram illustrating a partial circuit of the other physical quantity measurement device of the 5th embodiment.

The measurement device 10C may employ a circuit illustrated in FIG. 12 in the purpose of solving the above-mentioned problem. In FIG. 12, each of the switches Q12 and Q13 is a P-channel MOSFET. Each of the switches Q12 and Q13 has its N-type bulk connected to the power terminal 110 through the resistor R13, and has its drain (one of P-type regions) connected to the output terminal 111.

In FIG. 12, when the operational mode is switched from the normal mode to the adjusting mode, the power terminal 110 is likely to have lower potential than the output terminal 111, and then the N-type bulk is likely to being electrically conducted to the P-type region. However, the over current is suppressed by the resistor R13, because the N-type bulk of each of the switches Q12 and Q13 is connected to the power terminal 110 through the resistor R13. Preferably, the resistor R13 is a poly-silicon resistor. Alternatively the resistor R13 is an external resistor attached to the monolithic IC. The external resistor is a resistor (such as, a metal-film resistor and a carbon-film resistor) which is produced without semiconductors.

6th Embodiment

Figure 13:
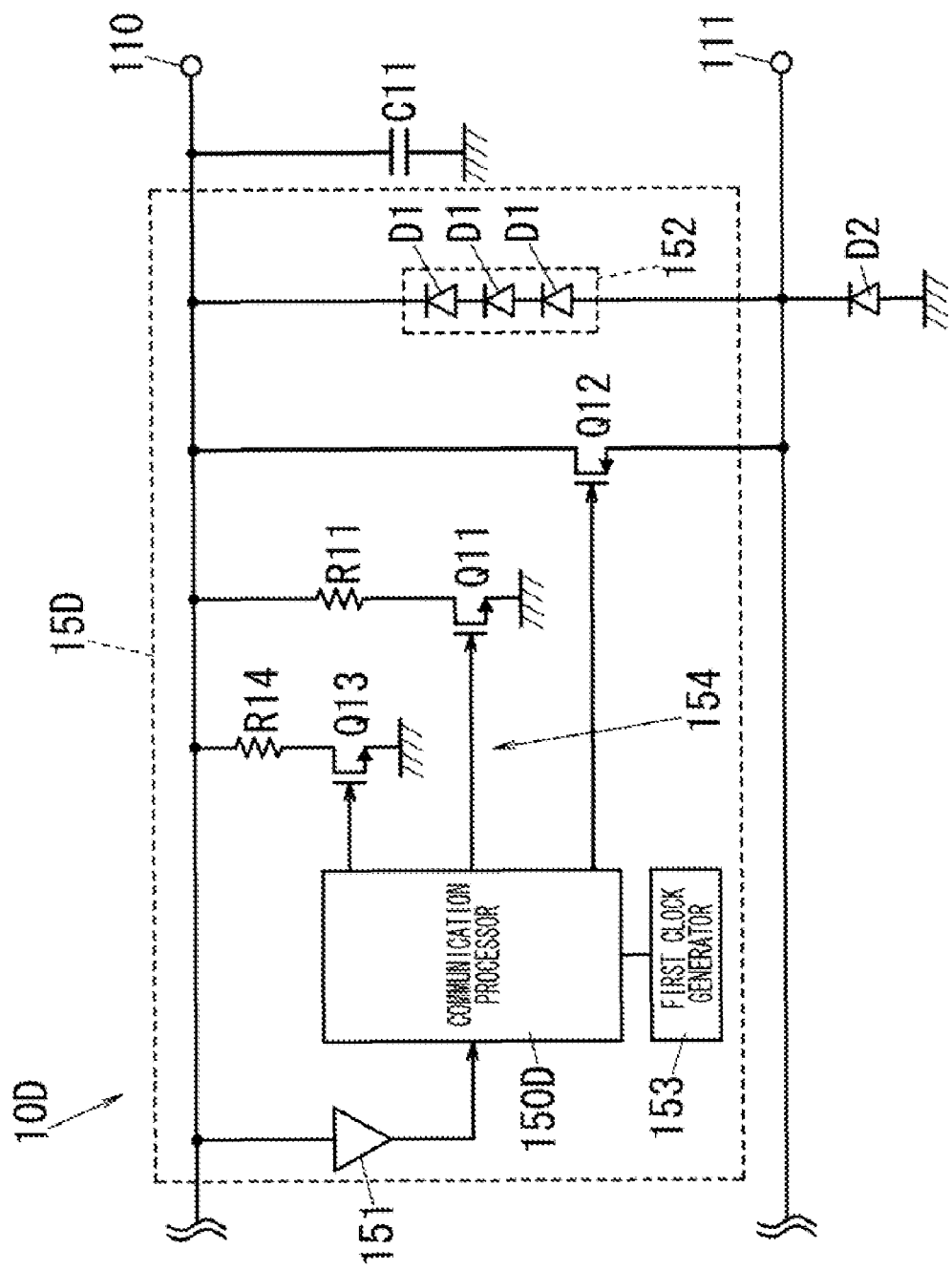
FIG. 13 shows a diagram illustrating a partial circuit of a physical quantity measurement device of a 6th embodiment.

Now referring to FIG. 13, an explanation is made to a measurement device 10D according to the sixth embodiment of the present invention which is basically identical to the first embodiment except for inclusion of an associated modification of the first communication unit 15D. Like parts are designated by like reference numerals optionally with a suffix letter of "D", and no duplication explanation is deemed necessary.

The first communication unit 15A includes a switch Q13 and a resistor R14, in addition to the communication processor 150D, the judging circuit 151, the switches Q11 and Q12, the resistor R11, the voltage lowering circuit 152, and the first clock generator 153.

The communication processor 150D, the switches Q11, Q12 and Q13, and the resistors R11 and R14 compose a driver circuit 154. The driver circuit 154 is configured to change the electric potential of the power terminal 110 to the high level potential or the low level potential of the serial signal to be transmitted to the management device 20.

The switch Q13 and the resistor R14 are connected in series between the power terminal 110 and the ground. The resistor R14 has smaller resistance than the resistor R11. In this explanation, it is assumed that resistance of the resistor R14 includes on-resistance of the switch Q13 and that resistance of the resistor R11 includes on-resistance of the switch Q11.

The communication processor 150D is configured to change the electric potential of the serial signal into the high level potential by means of turning on the switch Q12 and by turning off the switches Q11 and Q13. In this case, the power terminal 110 is short-circuited to the output terminal 111. In the present embodiment, the high level potential of the serial signal is 12V.

The communication processor 150D is configured to change the electric potential of the serial signal into the low level potential by means of turning off the switch Q12 and subsequently by turning on the switches Q11 and Q13. In this case, the bypass capacitor C11 is discharged through a first electric discharge path and a second electric discharge path. The first discharge path is composed of the resistor R14 and the switch Q13. The second discharge path is composed of the resistor R11 and the switch Q11. A discharging rate of the bypass capacitor C11 is determined by combined resistance of the resistors R11 and R14. The communication processor 150D is configured to turn off the switch Q14 when the electric potential of the power terminal 110 become lower than the second signal reception threshold (for example, 10V). Accordingly, the bypass capacitor C11 is discharged through only the second electric discharge path, and then the electric potential of the power terminal 110 reaches the low level potential of the serial signal.

The first discharge path can flow a greater discharge current from the bypass capacitor C11 than the second discharge path, since the resistor R14 has smaller resistance than the resistor R11.

Accordingly, the electric potential (the electric potential of the power terminal 110) of the serial signal to be transmitted to the management device 20 is rapidly lowered from the high level potential to the low level potential, until the electric potential of the power terminal 110 becomes lower than the second signal reception threshold. After the electric potential of the power terminal 110 becomes lower than the second signal reception threshold, the discharging rate of the bypass capacitor C11 is slowed. Therefore, the electric potential of the serial signal to be transmitted to the management device 20 is not lowered excessively.

As described above, the measurement device 10D is able to lower the electric potential of the serial signal to be transmitted to the management device 20 from the high level potential to the low level potential rapidly, even when the bypass capacitor C11 is connected to the power terminal 110. Moreover, the measurement device 10D is capable of preventing that the electric potential of the serial signal lowers excessively.

7th Embodiment

Figure 14:
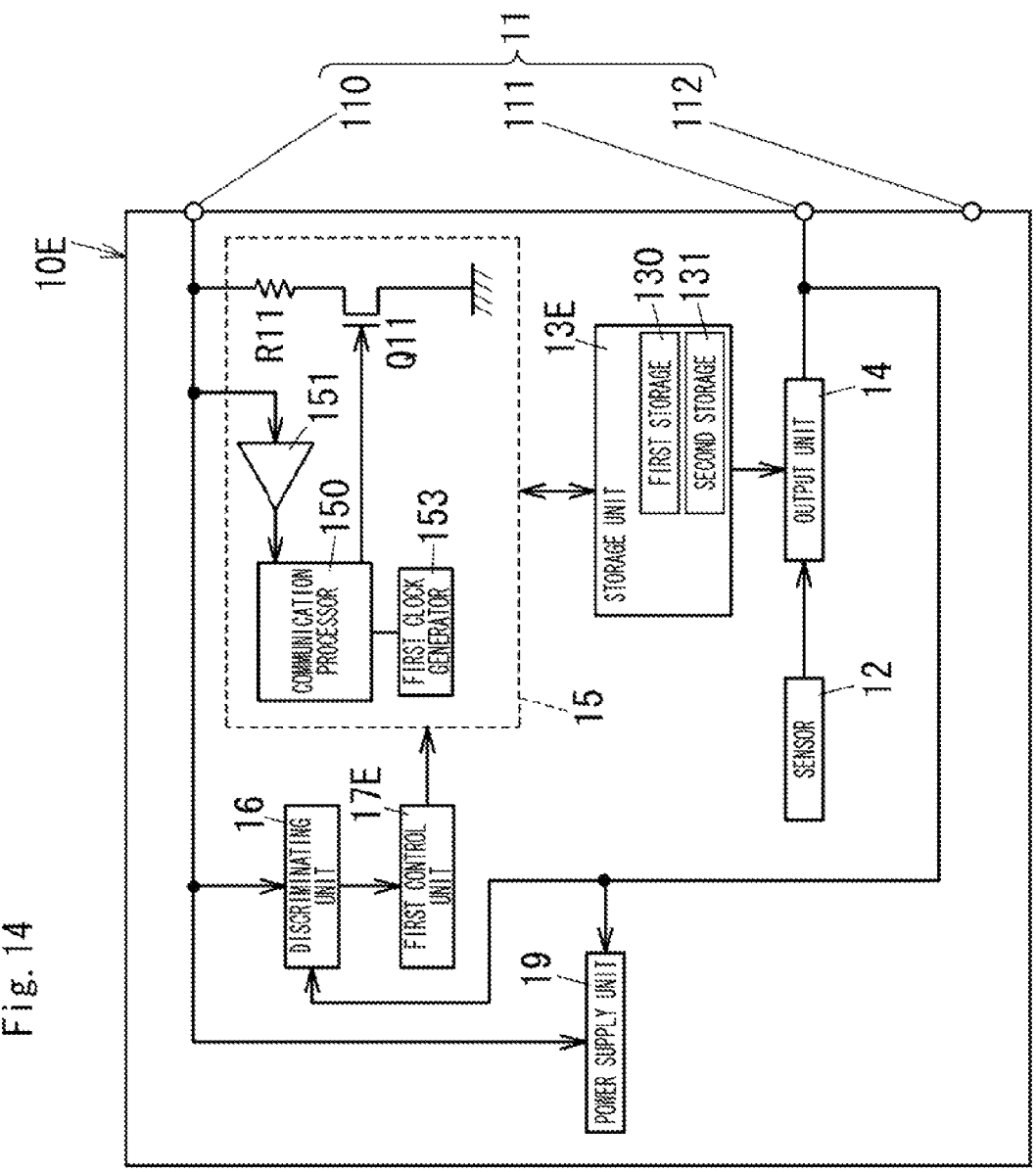
FIG. 14 shows a block diagram illustrating a physical quantity measurement device of a 7th embodiment.

Now referring to FIG. 14, an explanation is made to a measurement device 10E according to the seventh embodiment of the present invention which is basically identical to the first embodiment except for inclusion of an associated modification of the first control unit 17E and the storage unit 13E. Like parts are designated by like reference numerals optionally with a suffix letter of "E", and no duplication explanation is deemed necessary.

The storage unit 13E has a first storage 130 and a second storage 131. The first storage 130 is a nonvolatile memory such as an EEPROM. The second storage 131 is a volatile memory such as RAM.

The first control unit 17E has the normal mode (hereinafter called "first normal mode") and the adjusting mode (hereinafter called "first adjusting mode") as the operational mode.

The first normal mode includes a main normal mode and a sub normal mode.

In the main normal mode, the first control unit 17E is configured to activate the sensor 12, and to deactivate the first control unit 15. Further, the first control unit 17E controls the output unit 14 such that the output unit 14 corrects the detection value by use of the correction value stored in the first storage 130.

In the sub normal mode, as with the main normal mode, the first control unit 17E is configured to activate the sensor 12, and to deactivate the first control unit 15. The first control unit 17E controls the output unit 14 such that the output unit 14 corrects the detection value by use of the correction value stored in the second storage 131 in contrast with the main normal mode.

The first adjusting mode includes a main adjusting mode (an overwrite adjusting mode) and a sub adjusting mode.

In the sub adjusting mode, the first control unit 17E is configured to deactivate the sensor 12 and the output unit 14, and to activate the first control unit 15. Upon receiving the correction value from the management device 20, the first control unit 17E updates the correction value stored in the second storage 131 to the received correction value from the management device 20. After updating the correction value, the first control unit 17E controls the first communication unit 15 such that the first communication unit 15 transmits the correction value (the updated correction value) stored in the second storage 131 to the management device 20.

In the main adjusting mode, as with the sub adjusting mode, the first control unit 17E is configured to deactivate the sensor 12 and the output unit 14, and to activate the first control unit 15. In contrast with the sub adjusting mode, upon receiving the correction value from the management device 20, the first control unit 17E updates the correction value stored in the first storage 130 to the received correction value from the management device 20. After updating the correction value, the first control unit 17E controls the first communication unit 15 such that the first communication unit 15 transmits the correction value (the updated correction value) stored in the first storage 130 to the management device 20.

The management device 20 is configured to change the electric potential of each of the power terminal 110 and the output terminal 111 in accordance with the operational mode which the management device 20 requests to the measurement device 10E. The discriminating unit 16 is configured to discriminate the requested operational mode on the basis of the electric potential of each of the power terminal 110 and the output terminal 111.

In the measurement device 10E, using the main adjusting mode and the sub adjusting mode enables deciding the preferable correction value. In the main adjusting mode, the first storage 131 is capable of storing the preferable correction value. Subsequently, in the main normal mode, the detection value of the sensor 12 is corrected by use of the correction value stored in the first storage 130.

As described above, the measurement device 10E is capable of storing the correction value in the nonvolatile first storage 130 and the volatile second storage 131 selectively. Accordingly, the measurement device 10E enables checking the corrected detection signal (the corrected detection value) as well as readjusting the detection signal (or the correction value) by use of the second storage 131, even when the first storage 130 is not rewritable. Moreover, a time of adjusting the measurement device 10E is able to be shortened by use of the second storage 131 which is faster in reading/writing speed than the first storage 130.

Alternatively, the first control unit 17E has a second normal mode instead of the first normal mode.

In the second normal mode, the first control unit 17E is configured to activate the sensor 12, and to deactivate the first control unit 15. Further, the first control unit 17E controls the output unit 14 such that the output unit 14 corrects the detection value by use of the correction value stored in the first storage 130. In addition, the first control unit 17E is configured to execute a transmission operation. In the transmission operation, the first control unit 17E updates the correction value stored in the second storage 131 to the correction value stored in the first storage 130 at the time of switching to the second normal mode or at regular time intervals. The first control unit 17E is configured to terminate executing the transmission operation when the first communication unit 15 receives a transmission stop signal from the management device 20.

According to this modification, it is unnecessary to switch the operational mode between the main normal mode and the sub normal mode. Therefore, application of the second normal mode enables simplifying an operation of adjusting the measurement device 10E.

Alternatively, the first control unit 17E has a second adjusting mode instead of the first adjusting mode.

In the second adjusting mode, the first control unit 17E is configured to deactivate the sensor 12 and the output unit 14, and to activate the first control unit 15. When the first communication unit 15 receives the correction value from the management device 20, the first control unit 17E executes a first operation. In the first operation, the first control unit 17E updates the correction value stored in the second storage 131 to the received correction value from the management device 20, and then controls the first communication unit 15 such that the first communication unit 15 transmits the correction value (the updated correction value) stored in the second storage 131 to the management device 20.

In the second adjusting mode, when the first communication unit 15 receives a set signal from the management device 20, the first control unit 17E executes a second operation. In the second operation, the first control unit 17E updates the correction value stored in the first storage 130 to the received correction value from the management device 20, and then controls the first communication unit 15 such that the first communication unit 15 transmits the correction value (the updated correction value) stored in the first storage 130 to the management device 20.

In the second adjusting mode, when the first communication unit 15 receives a reset signal from the management device 20, the first control unit 17E executes a third operation. In the third operation, the first control unit 17E updates the correction value stored in the second storage 131 to the correction value stored in the first storage 130, and then controls the first communication unit 15 such that the first communication unit 15 transmits the correction value (the updated correction value) stored in the second storage 131 to the management device 20.

As described above, the measurement device 10E executes the first operation, the second operation, and the third operation upon request of the management device 20. Therefore, application of the second adjusting mode enables shortening the time of adjusting the measurement device 10E.

Besides, when the measurement device 10E has two operational modes, the second normal mode and the second adjusting mode, the time of adjusting the measurement device 10E is able to be more shortened. Further, this modification is able to improve accuracy of discriminating the operational mode than the measurement device 10E having at least three operational modes.

8th Embodiment

Figure 15:
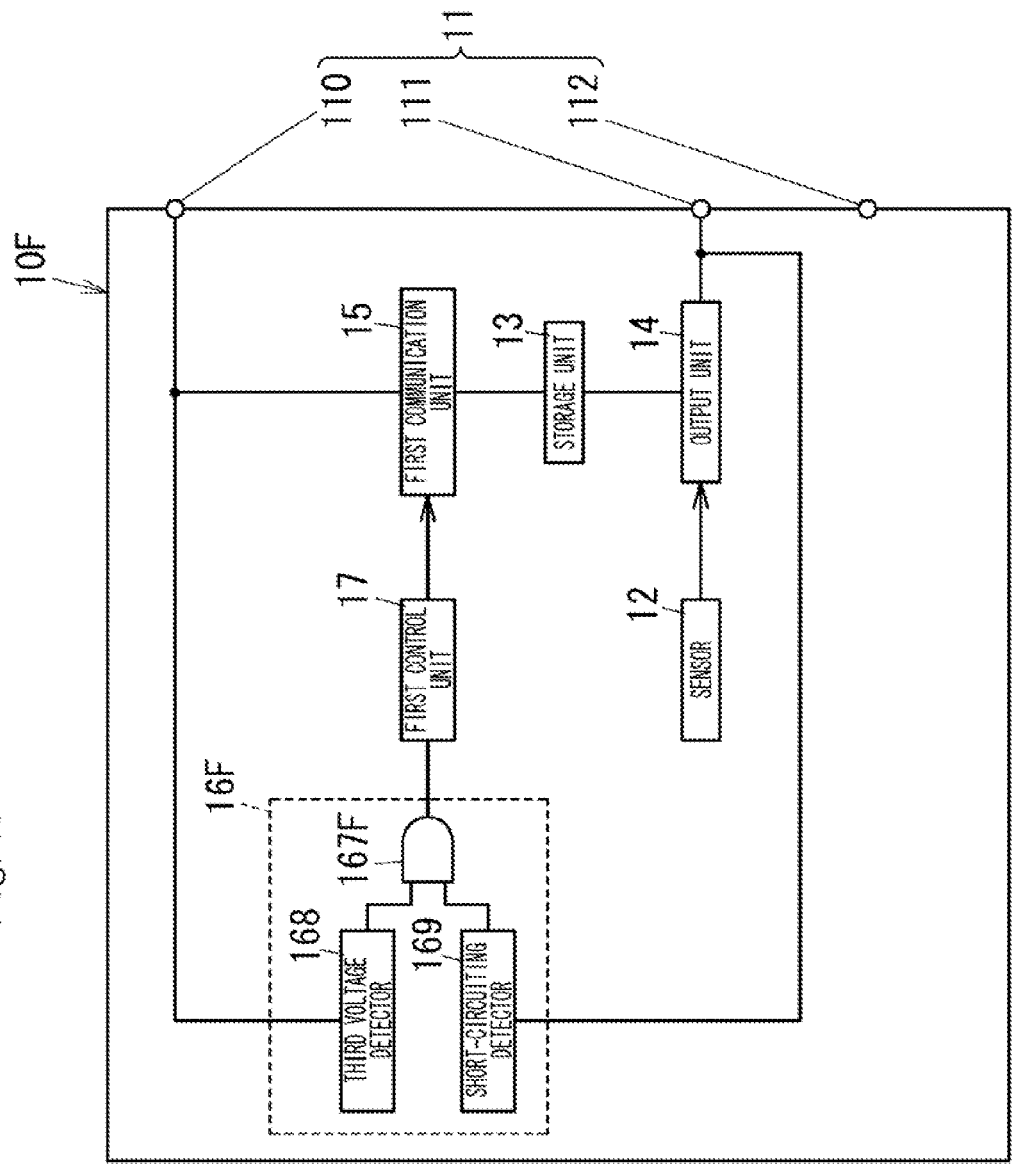
FIG. 15 shows a block diagram illustrating a physical quantity measurement device of an 8th embodiment.

Now referring to FIG. 15, an explanation is made to a measurement device 10F according to the eighth embodiment of the present invention which is basically identical to the fifth embodiment except for inclusion of an associated modification of the discriminating unit 16F. Like parts are designated by like reference numerals optionally with a suffix letter of "F", and no duplication explanation is deemed necessary. Besides, the power supply unit 19 is not shown in FIG. 15.

The discriminating unit 16F has a third voltage detector 168, a short-circuiting detector 169, and the AND circuit 167F.

The third voltage detector 168 is an overvoltage detector configured to detect the electric potential of the power terminal 110 which exceeds a predetermined third detection potential (for example 6V). The third voltage detector 168 is configured to output a high level fourth signal to the AND circuit 167F when the electric potential of the power terminal 110 exceeds the third detection potential (=6V), and to output a low level fourth signal to the AND circuit 167F when the electric potential of the power terminal 110 is less or equal to the third detection potential.

The short-circuiting detector 169 is configured to detect whether or not the output terminal 111 has been short-circuited. The short-circuiting detector 169 is configured to output a high level fifth signal when the output terminal 111 is short-circuited. The short-circuiting detector 169 is configured to output a low level fifth signal while the output terminal 111 is not short-circuited. In the present embodiment, when an electric potential difference between the output terminal 111 and the power terminal 110 is below a short-circuiting judgment threshold, the short-circuiting detector 169 judges that the output terminal 111 is short-circuited to the power terminal 110. In this case, the short-circuiting detector 169 outputs the high level fifth signal. It is noted that the short-circuiting detector 169 may be configured to detect short-circuiting between the output terminal 111 and the ground terminal 112. Moreover, the short-circuiting detector 169 may be configured to detect short-circuiting on the basis of magnitude of a current flowing through the output terminal 111.

The measurement device 10F has a protection circuit (not shown) in order to protect electrical circuits of the measurement device 10F from short-circuiting. The protection circuit executes a required processing, such as deactivating the output unit 14. The protection circuit operates regardless of the operational mode of the first control unit 17C. Such protection circuit is well known, and its explanation is deemed unnecessary.

The AND circuit 167F is configured to output the high level third signal both of the first control unit 17C and the power supply unit 19, during receiving the high level fourth signal and the high level fifth signal.

The first control unit 17C operates in the adjusting mode upon receiving the high level third signal from the AND circuit 167F, and operates in the normal mode upon receiving the low level third signal from the AND circuit 167F.

The management device 20 used with the measurement device 10F of the present embodiment includes a short-circuiting switch (not shown) connected between the input terminal 211 and the feed terminal 210. The second control unit 24 of the management device 20 is configured to turn off the short-circuiting switch when the management device 20 requests the normal mode, and to turn on the short-circuiting switch when the management device 20 requests the adjusting mode. It is noted that the short-circuiting switch may be configured to ground the input terminal 211 when the short-circuiting detector 169 is configured to detect short-circuiting between the output terminal 111 and the ground terminal 112.

In the measurement device 10F of the present embodiment, the operational mode is switched from the normal mode to the adjusting mode when the electric potential of the power terminal 110 is different from the electric potential of the power terminal 110 at the normal mode, while the electric potential of the output terminal 111 is different from the electric potential of the output terminal 111 at the normal mode. Therefore, unexpected switching of the operational mode is prevented.

The discriminating unit 16F discriminates the requested operational mode from the management device 20 based on whether or not the output terminal 111 is short-circuited. Therefore, the short-circuiting detector 169 used for a short-circuiting protection circuit is applicable for discriminating the operational mode. Accordingly, the measurement device 10F does not require an additional circuit for detecting the electric potential change of the output terminal 111. The measurement device 10F is capable of being downsized and is capable of lowering its production costs.

The third voltage detector 168 may be a low-voltage detector configured to detect the electric potential of the power terminal 110 which is not higher than the predetermined third detection potential (for example 4.5V). The third voltage detector 168 is configured to output the high level fourth signal to the AND circuit 167F when the electric potential of the power terminal 110 is not higher than the third detection potential (=4.5V). The third voltage detector 168 is configured to output the low level fourth signal to the AND circuit 167F when the electric potential of the power terminal 110 exceeds the third detection potential.

9th Embodiment)

Figure 16:
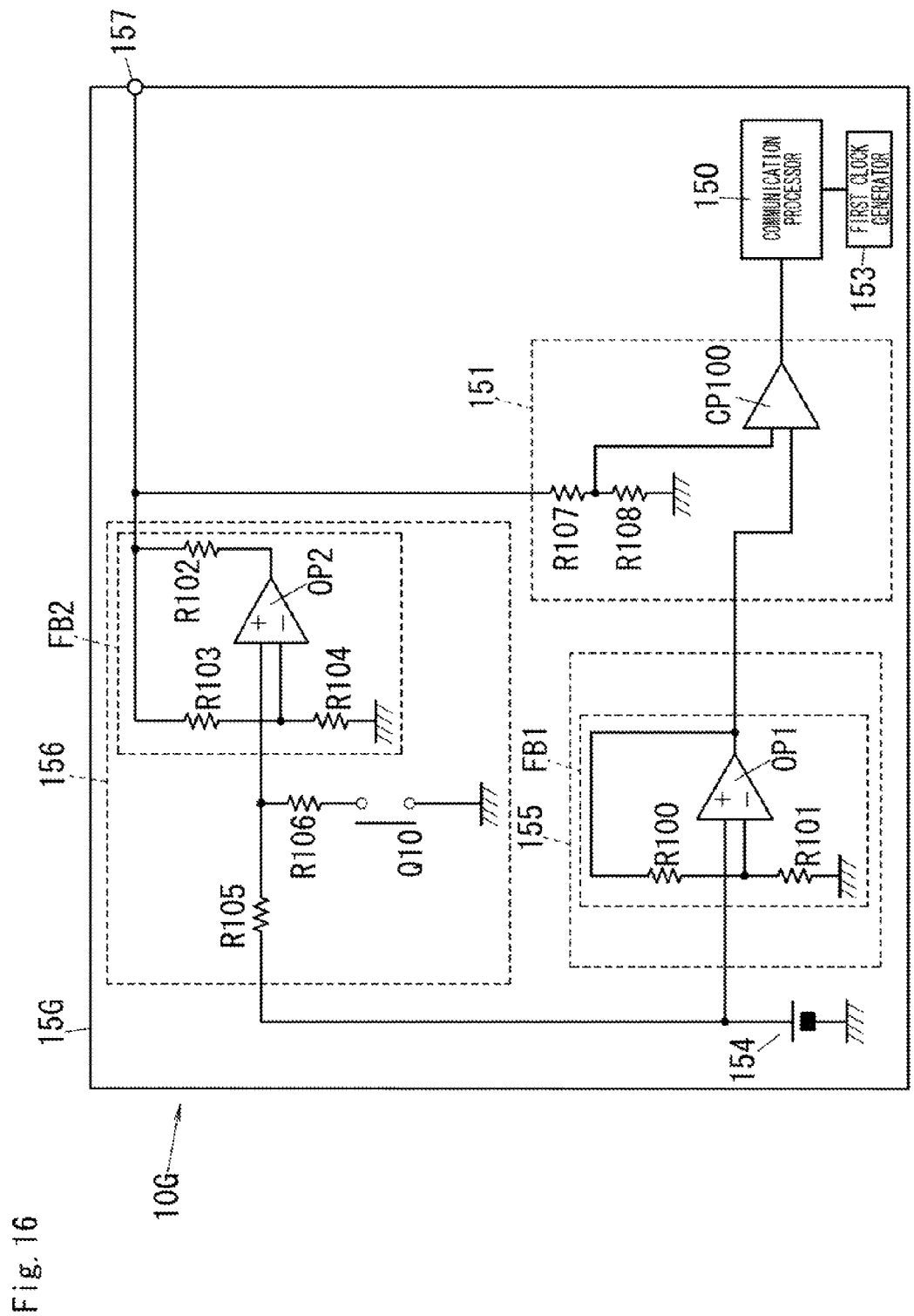
FIG. 16 shows a block diagram illustrating a communication unit of a physical quantity measurement device of a 9th embodiment.

Now referring to FIG. 16, an explanation is made to a measurement device 10G according to the ninth embodiment of the present invention which is basically identical to the first embodiment except for inclusion of an associated modification of the first communication unit 15G. Like parts are designated by like reference numerals optionally with a suffix letter of "G", and no duplication explanation is deemed necessary.

The first communication unit 15G includes a voltage regulator 154, a threshold generation circuit 155, an electric potential setting circuit 156, and a signal terminal 157 in addition to the communication processor 150, the judging circuit 151, and the first clock generator 153.

The voltage regulator 154 is configured to generate a desired constant voltage by use of the drive voltage generated by the power supply unit 19. The voltage regulator 154 is, for example, a bandgap reference circuit.

The threshold generation circuit 155 is configured to generate the first signal reception threshold of the judging circuit 151. The threshold generation circuit 155 includes an operational amplifier OP1 and two resistors R100 and R101. The resistor R100 is used for feedback, and is connected between an output terminal and an inverting input terminal of the operational amplifier OP1. The inverting input terminal of the operational amplifier OP1 is grounded through the resistor R101. The operational amplifier OP1 and the resistors R100 and R101 compose a negative feedback amplifier FB1 acted as a so-called noninverting amplifier. The threshold generation circuit 155 outputs the output potential of the voltage regulator 154 amplified by the negative feedback amplifier FB1. An electric potential of the output terminal of the operational amplifier OP1 defines the first signal reception threshold of the judging circuit 151.

The electric potential setting circuit 156 is configured to determine the high level potential and the low level potential of the serial signal transmitted to the management device 20. The electric potential setting circuit 156 includes an operational amplifier OP2, five resistors R102, R103, R104, R105 and R106, and a switch Q10. The operational amplifier OP2 has its output terminal connected to the signal terminal 157 through the resistor R102 and has its inverting input terminal connected through R103 to a point where the resistor R102 and the signal terminal 157 are connected each other. The inverting input terminal of the operational amplifier is grounded through the resistor R104. The operational amplifier OP2 and the resistors R102, R103 and R104 compose a negative feedback amplifier FB2. The operational amplifier OP2 has its noninverting input terminal connected to the output terminal of the voltage regulator 154 through the resistor R105 and the noninverting input terminal is grounded by a series circuit composed by the resistor R106 and the switch Q10.

While the switch Q10 is kept turning off, the negative feedback amplifier FB2 amplifies the output potential of the voltage regulator 154, and applies the same to the signal terminal 157. While the switch Q10 is kept turning on, the negative feedback amplifier FB2 amplifies the output potential of the voltage regulator 154 divided by the resistors 8105 and R106, and applies the same to the signal terminal 157. Therefore, the electric potential setting circuit 156 applies the high level potential while the switch Q10 is kept turning off, and applies the low level potential while the switch Q10 is kept turning on. The switch Q10 is controlled by the communication processor 150.

The judging circuit 151 includes a comparator CP100 and two resistors R107 and R108. The comparator CP100 receives an electric potential obtained by dividing an electric potential of the signal terminal 157 by the resistors 8107 and R108 as an input potential. The comparator CP100 and receives the electric potential of the output terminal of the operational amplifier OP1 as a reference potential. The judging circuit 151 judges whether the received serial signal has the high level potential or the low level potential, by comparing the input potential with the reference potential.

The measurement device 10G is capable of stabilizing the electric potential of the serial signal, because the first communication unit 15G generates the high level potential and the low level potential of the serial signal by use of the voltage regulator 154. It is noted that the electric potential setting circuit 156 may be configured to generate either the high level potential or the low level potential.

Moreover, the measurement device 10G is capable of improving accuracy of receiving the serial signal from the management device 20, because the first reception threshold of the judging circuit 151 is generated from the output potential of the voltage regulator 154.

10th Embodiment

An explanation is made to a measurement device 10 according to the tenth embodiment of the present invention which is basically identical to the measurement device 10C according to fifth embodiment except for inclusion of an associated modification of the first communication unit 15. Like parts are designated by like reference numerals and no duplication explanation is deemed necessary.

Figure 17:
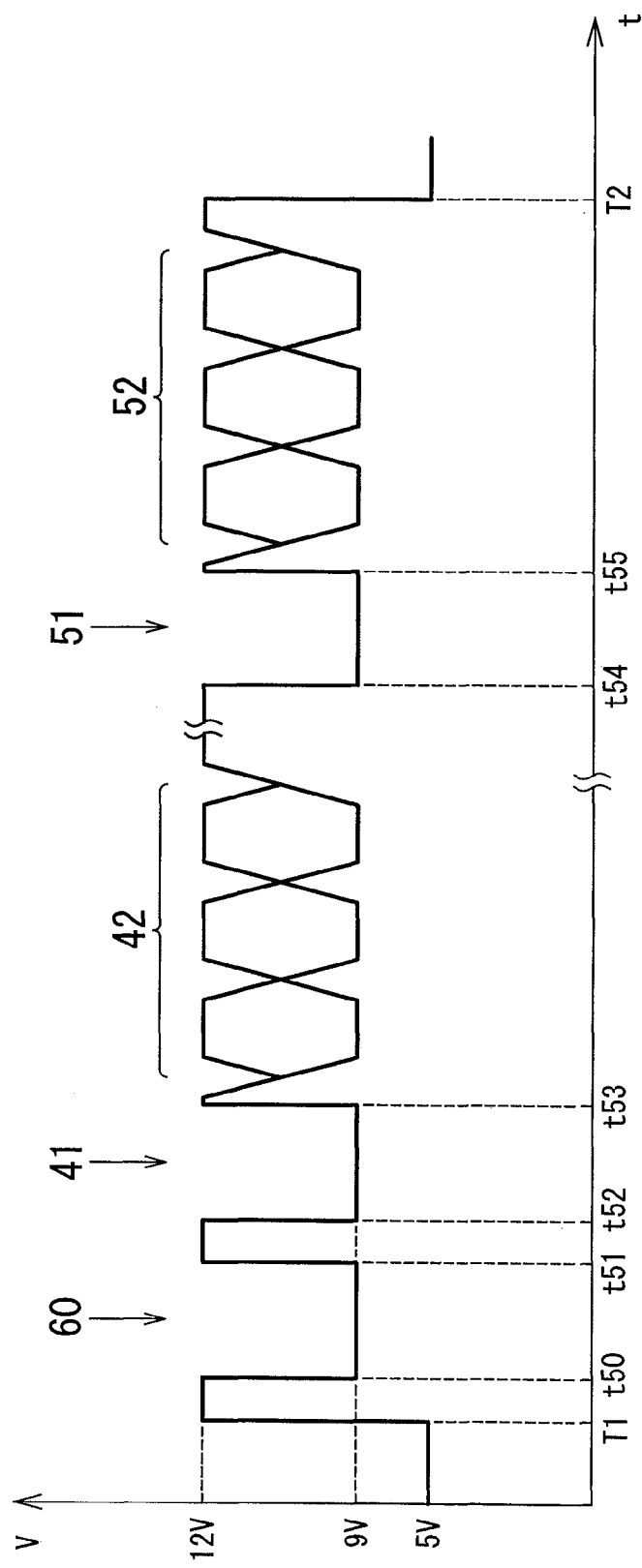
FIG. 17 shows a diagram illustrating serial communication in a physical quantity detecting system employing a physical quantity measurement device of a 10th embodiment.

In the present embodiment, the communication processor 150 of the first communication unit 15 is configured to execute a synchronous processing to synchronize with the management device 20C. Referring to FIG. 17, the communication processor 150 is configured to transmit a synchronous bit (a synchronous signal) 60 synchronized with the first clock signal output from the first clock generator 153 before transmitting the serial signal in order to establish the serial communications with the management device 20C.

An explanation is made to a management device 20 mentioned in the tenth embodiment of the present invention which is basically identical to the management device 20C mentioned in fifth embodiment except for inclusion of an associated modification of the second communication unit 23. Like parts are designated by like reference numerals and no duplication explanation is deemed necessary.

In the present embodiment, the communication processor 230 of the second communication unit 23 is configured to obtain clock information (a phase and a cycle of the clock signal) of the measurement device 10C by means of measuring the synchronous bit 60. The communication processor 230 is configured to set the second communication clock. For example, upon receiving the synchronous bit 60, the communication processor 230 measures a length of the received synchronous bit 60. The communication processor 230 employs the length of the synchronous bit as a length of a one-bit of the serial signal to be transmitted by the first communication unit 15. The communication processor 230 turns on and off the switch Q11 on the basis of the length of the one-bit of the serial signal.

Next referring to FIG. 17, the operation of the physical quantity detecting system employing the measurement device 10C is explained. FIG. 17 illustrates changes in the electric potential of the power terminal 110.

Before time T1 in FIG. 17, the measurement device 10C operates in the normal mode.

When the adjusting mode is selected by use of the input output device, the second control unit 24C turns off the switch SW20, and turns on the switches SW21 and SW22. Each of the power terminal 110 and the output terminal 111 of the measurement device 10C receives an electric potential of 12V.

In this case, the discriminating unit 16C judges that the management device 20C requests the adjusting mode. Then, the measurement device 10 starts to operate in the adjusting mode. After transition to the adjusting mode, the first communication unit 15 transmits the synchronous bit 60 by changing the electric potential of the power terminal 110 into the low level potential (9V) for a predetermined period (time t50 to t51) in synchronization with the first clock signal of the first clock generator 153.

As a result, the second communication unit 23 receives the synchronous bit 60 from the measurement device 10C, and subsequently acquires the clock information from the received synchronous bit 60. Then, the second communication unit 23 sets the communication clock on the basis of the acquired clock information.

When a user inputs the correction value by use of the input output device, the second control unit 24C controls the second communication unit 23 such that the second control unit 23 transmits the correction data indicating the input correction value. The second communication unit 23 transmits the start bit 41 (time t52 to t53) and subsequently transmits the bit sequence 42 indicating the input correction data. Moreover, the second communication unit 23 transmits the stop bit (not shown) to notify the measurement device 10C that the transmission has been finished.

The first control unit 17C checks whether or not the production ID included in the correction data is identical to own production ID, upon receiving the correction data at the first communication unit 15. When the production ID included in the received correction data is identical to own production ID, the first control unit 17C updates the correction value stored in the storage unit 13 with the received correction value from the management device 20C. By contrast, when the production ID included in the received correction data is not identical to own production ID, the first control unit 17C discards the received correction data.

After updating, the first control unit 17C controls the first communication unit 15 such that the first control unit 15 transmits the response data. That is, the first communication unit 15 transmits the start bit 51 (time t54 to t55) and subsequently transmits the bit sequence 52 indicating the correction data. After transmitting the bit sequence 52, the first communication unit 15 transmits the stop bit (not shown) to notify the management device 20C that the transmission has been finished.

The second control unit 24C checks whether or not both of the correction value and the production ID included in the response data are identical to the correction data and the production ID included in the transmitted correction data to the measurement device 10C respectively, upon receiving the response data at the second communication unit 23. When both of the correction value and the production ID included in the received response data are identical to both of the correction value and the production ID included in the transmitted correction data to the measurement device 10C, the second control unit 24C judges that an update of the correction value has succeeded. When the correction value included in the received response data is not identical to the correction value included in the transmitted correction data to the measurement device 10C, or when the production ID included in the received response data is not identical to the production ID included in the transmitted correction data to the measurement device 10C, the second control unit 24C judges that the update of the correction value has failed. The second control unit 24C informs users of a result indicating whether or not the update of the correction value has succeeded, by use of the input output device.

When the normal mode is selected by use of the input output device, the second control unit 24C turns on the switch SW20, and turns off the switches SW21 and SW22. The power terminal 110 of the measurement device 10C receives an electric potential of 5V. Since the first voltage detector 165 outputs the low level first signal, the AND circuit 167 outputs the low level third signal. Accordingly, the first control unit 17C operates in the normal mode.

In the physical quantity detecting system employing the measurement device 10C of the present embodiment, the first communication unit 15 executes the synchronous processing before the measurement device 10C starts to establish the serial communication with the management device 20C. Accordingly, accuracy of the serial communications between the measurement device 10C and the management device 20C is improved.

Especially, the physical quantity detecting system enables synchronizing a cycle of the second clock signal of the second clock generator 233 with a cycle of the first clock signal of the first clock generator 153, because the synchronous signal 60 is transmitted from the measurement device 10C to the management device 20C. This allows the measurement device 10C to employ a comparatively less accurate clock generator as the first clock generator 153. The measurement device 10C is capable of being downsized and is capable of lowering its production costs.

It is noted that the second communication unit 23 of the management device 20C may be configured to transmit the synchronous signal 60. That is, either the first communication unit 15 or the second communication unit 23 may be configured to transmit the synchronous signal 60. In this case, either the first communication unit 15 or the second communication unit 23 may set the communication clock on the basis of the received synchronous signal 60.

Moreover, the communication processor 230 of the management device 20C is configured to executes a phase initialization processing in which the communication processor 230 conforms the phase of the second communication clock to a phase of the first communication clock, upon starting to receive the serial signal, that is, upon receiving the serial signal from the first communication unit 15. For example, the communication processor 230 conforms the phase of the second communication clock to an initial phase of the first communication clock of the measurement device 10C.

Figure 18:
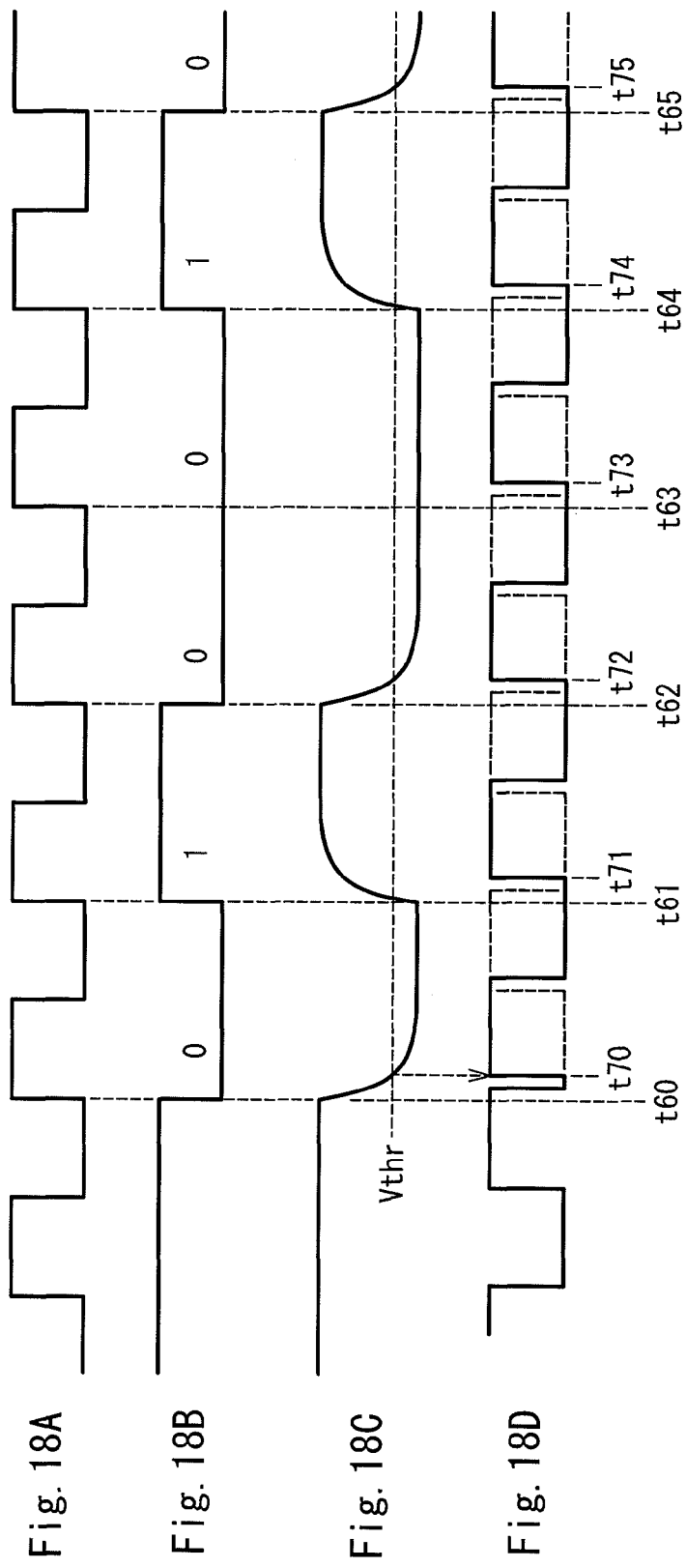
FIGS. 18A-18D shows a diagram illustrating serial communication in the other physical quantity detecting system.

Now referring to FIG. 18, the operation of the management device 20C is explained.

FIG. 18A shows a waveform of the first communication clock of the first communication unit 15. FIG. 18B shows the serial signal transmitted from the first communication unit 15. In FIG. 18, the communication processor 150 switches the electric potential of the serial signal between the high level and the low level on a rising edge (a leading edge) of the first communication clock. That is, the electric potential of the serial signal is switched at the time that an electric potential of the first communication clock is switched from a low level to a high level (time t60, t61, t62, t63, t64, t65). The first communication unit 15 starts to transmit the serial signal having a bit sequence "010010" at time t60. An initial bit "0" of this serial signal is used as the start bit.

FIG. 18C shows the electric potential of the power terminal 110. In FIG. 18C, an electric potential waveform of the power terminal 110 is dulled by the bypass capacitor C11 connected to the power terminal 110.

FIG. 18D shows a waveform of the second communication clock of the second communication unit 23. The communication processor 230 judges whether the received serial signal has the high level potential or the low level potential while the second communication clock has the low level potential. At time t70, the electric potential of the power terminal 110 becomes below the second signal reception threshold (in FIG. 18C), and then the judging circuit 231 judges that the received serial signal has the low level potential. At this time, the communication processor 230 executes the phase initialization processing After the communication processor 230 once executes the phase initialization processing, the communication processor 230 does not executes the phase initialization processing until the serial communications are finished (for example, until receiving the stop bit).

As described above, the communication processor 230 executes the phase initialization processing upon detecting the trailing edge of the start bit. Referring to FIG. 18D, the second communication clock before execution of the phase initialization processing is shown by the solid line, and the second communication clock after execution of the phase initialization processing is shown by the dash line.

Before execution of the phase initialization processing (before time 70), the phase of the second communication clock is greatly different from the phase of the first communication clock. FIG. 18 shows that a phase difference between the second communication clock and the first communication clock is corresponding to about a half cycle of the first communication clock. This is caused by a measurement error of the length of the synchronous bit 60. That is, the measurement error may cause a slight difference in cycle between the second communication clock and the first communication clock. As a result, the phase difference varies depending on time. When the phase difference becomes comparatively big, the phase difference is likely to become about 180 degree. As described above, the phase difference makes it difficult to receive the serial signal precisely.

The communication processor 230 makes the phase initialization processing upon receiving the serial signal (the start bit) from the first communication unit 15. It is able to enough reduce the phase difference between the first communication clock and the second communication clock.

Accordingly, a time difference between the rising edge (t60, t61, t62, t63, t64, t65) of the first communication clock and the rising edge (t70, t71, t72, t73, t74, t75) of the second communication clock becomes small. Therefore, the physical quantity detecting system mentioned in the present embodiment enables highly accurate serial communications in the adjusting mode.

By the way, when the electric potential waveform of the power terminal 110 is dulled, a period that the electric potential of the power terminal 110 becomes less than the second signal reception threshold Vthr is likely to become shorter than the cycle of the second communication clock. In this case, the communication processor 230 does not execute the phase initialization processing because the second communication unit 23 fails to detect the start bit of the measurement device 10C. In view of this insufficiency, it is preferable that the communication processor 230 is configured to initialize the second communication clock upon detecting a trailing edge of the start bit of the measurement device 10C. This modified communication processor 230 is capable of successfully making the phase initialization processing.

As described above, the management device 20C is configured to set the second communication clock, upon receiving the synchronous bit 60 from the measurement device 10C. Preferably, the management device 20C is configured to execute the phase initialization processing, upon receiving the serial signal, after the management device 20C receives once the synchronous bit 60. In this modification, the synchronous processing is not required every time the management device 20C starts to establish the serial communication with the measurement device 10C. Accordingly, this modification is capable of improving efficiency of processing for the serial communications.

Moreover, it is preferable that the second clock signal of the second clock generator 233 is enough higher in frequency than the first clock signal of the first clock generator. In this case, the second communication clock being most proximate to the first communication clock is able to be generated by adding a required number of clock pulses of the second clock signal.

11th Embodiment

An explanation is made to a measurement device 10C according to the eleventh embodiment of the present invention which is basically identical to the tenth embodiment except for inclusion of an associated modification of the first control unit 15 and the discriminating unit 16C. Like parts are designated by like reference numerals, and no duplication explanation is deemed necessary.

In the present embodiment, the judging circuit 151 of the first communication unit 15 has the first signal reception threshold of 3.5V. The judging circuit 151 judges the electric potential of the power terminal 110 as the high level while the electric potential of the power terminal 110 exceeds the first signal reception threshold, and judges the electric potential of the power terminal 110 as the low level while the electric potential of the power terminal 110 is less or equal to the first signal reception threshold. In the present embodiment, the electric potential of the power terminal 110 is 4V while the switch Q11 and Q12 are turned off. In this case, the resistors R11, R21 and R22 have a resistance such that the electric potential of the power terminal 110 is 3V while the switch Q11 and Q12 are turned on. That is, the measurement device 10C and the management device 20C is configured that the high level potential of the serial signal is 4V and that the low level potential of the serial signal is 3V.

In the present embodiment, the first voltage detector 165 is configured to output the high level first signal to the AND circuit 167 when the electric potential of the power terminal 110 is less or equal to the first detection potential (=4.5V), and to output the low level first signal to the AND circuit 167 when the electric potential of the power terminal 110 exceeds the first detection potential. The second voltage detector 166 is configured to output the high level second signal to the AND circuit 167 when the electric potential of the output terminal 111 exceeds the second detection potential (=3.5V), and to output the low level second signal to the AND circuit 167 when the electric potential of the output terminal 111 is less or equal to the second detection potential.

An explanation is made to a management device 20C used with the measurement device 10C according to the eleventh embodiment of the present invention which is basically identical to the tenth embodiment except for inclusion of an associated modification of the second communication unit 23 and the second feed unit 222. Like parts are designated by like reference numerals, and no duplication explanation is deemed necessary.

The second feed unit 222 according to the present embodiment has the output potential of 4V.

In the present embodiment, the judging circuit 231 of the second communication unit 23 has the second signal reception threshold of 3.5V. The judging circuit 231 judges the electric potential of the feed terminal 210 as the high level while the electric potential of the feed terminal 210 exceeds the second signal reception threshold (=3.5V), and judges the electric potential of the feed terminal 210 as the low level while the electric potential of the feed terminal 210 is less or equal to the second signal reception threshold (=3.5V).

Figure 19:
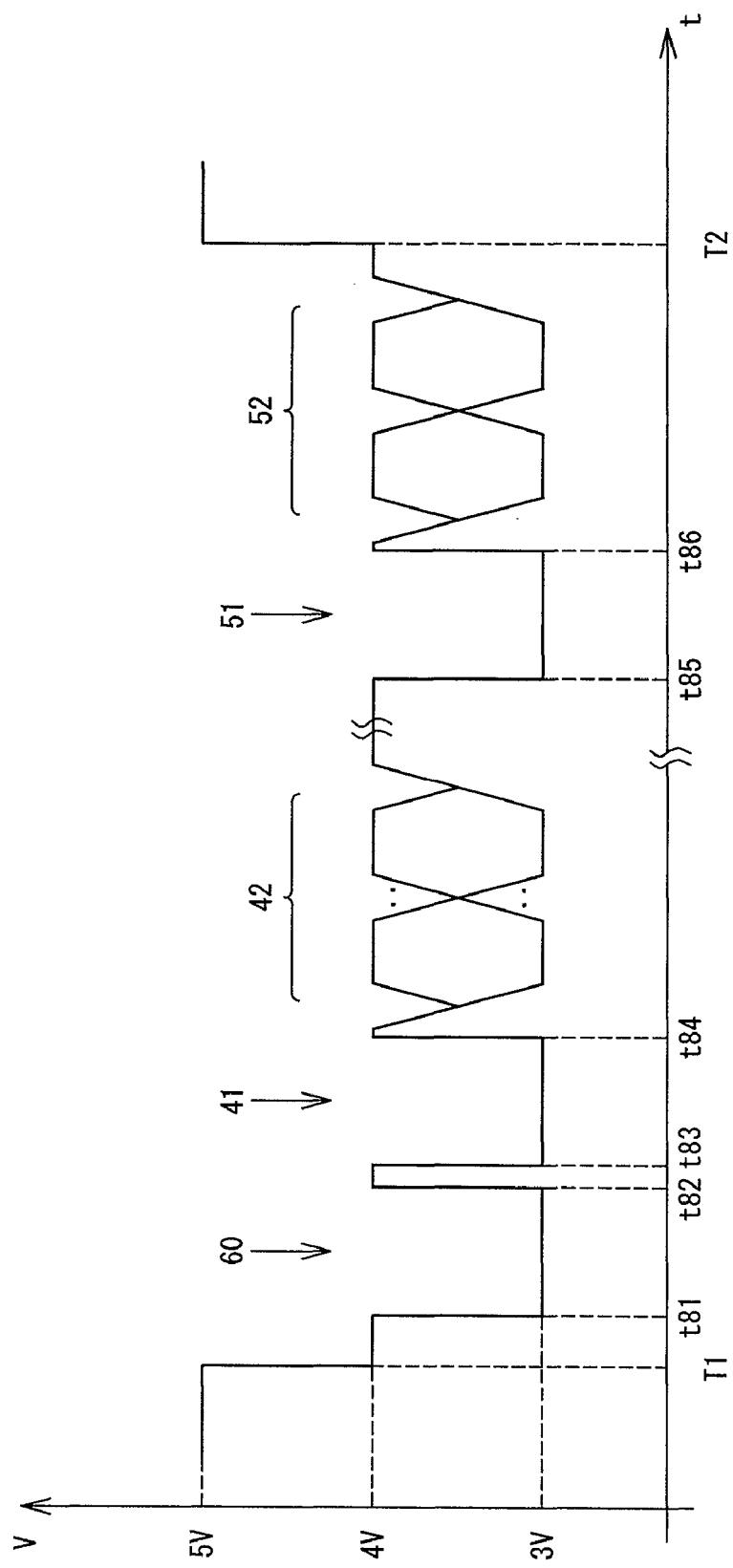
FIG. 19 shows a diagram illustrating serial communication in a physical quantity detecting system employing a physical quantity measurement device of an 11th embodiment.

Next referring to FIG. 19, it is explained that the operation of the physical quantity detecting system employing the measurement device 10C according to the present embodiment. FIG. 19 illustrates changes in the electric potential of the power terminal 110.

Before time T1 in FIG. 19, the measurement device 10C operates in the normal mode.

When the adjusting mode is selected by use of the input output device, the second control unit 24C turns off the switch SW20, and turns on the switches SW21 and SW22. Each of the power terminal 110 and the output terminal 111 of the measurement device 10C receives an electric potential of 4V.

The first voltage detector 165 outputs the high level first signal to the AND circuit 167, and the second voltage detector 166 outputs the high level second signal to the AND circuit 167, and then, the AND circuit 167 outputs the high level third signal to the first control unit 17C.

Therefore, the measurement device 10C starts to operate in the adjusting mode. After transition to the adjusting mode, the first communication unit 15 transmits the synchronous bit 60 by changing the electric potential of the power terminal 110 into the low level potential (3V) for a predetermined period (time t80 to t81) in synchronization with the first clock signal of the first clock generator 153.

The second communication unit 23 receives the synchronous bit 60 from the measurement device 10C, and subsequently acquires the clock information from the received synchronous bit 60. Then, the second communication unit 23 sets the communication clock on the basis of the acquired clock information.

When a user inputs the correction value by use of the input output device, the second control unit 24C controls the second communication unit 23 such that the second control unit 23 transmits the correction data indicating the input correction value. The second communication unit 23 transmits the start bit 41 (time t82 to t83) and subsequently transmits the bit sequence 42 indicating the input correction data. Moreover, the second communication unit 23 transmits the stop bit (not shown).

The first control unit 17C checks whether or not the production ID included in the correction data is identical to own production ID, upon receiving the correction data at the first communication unit 15. When the production ID included in the received correction data is identical to own production ID, the first control unit 17C updates the correction value stored in the storage unit 13 with the received correction value from the management device 20C. By contrast, when the production ID included in the received correction data is not identical to own production ID, the first control unit 17C discards the received correction data.

After updating, the first control unit 17C controls the first communication unit 15 such that the first control unit 15 transmits the response data. That is, the first communication unit 15 transmits the start bit 51 (time t54 to t55) and subsequently transmits the bit sequence 52 indicating the correction data. After transmitting the bit sequence 52, the first communication unit 15 transmits the stop bit (not shown).

The second control unit 24C checks whether or not both of the correction value and the production ID included in the response data are identical to the correction data and the production ID included in the transmitted correction data to the measurement device 10C respectively, upon receiving the response data at the second communication unit 23.

When the normal mode is selected by use of the input output device, the second control unit 24C turns on the switch SW20, and turns off the switches SW21 and SW22. The power terminal 110 of the measurement device 10C receives an electric potential of 5V. Accordingly, the first control unit 17C operates in the normal mode.

In the present embodiment, the discriminating unit 16C discriminates the operational mode requested by the management device 20C based on whether or not the electric potential of the power terminal 110 is lower than the electric potential of the power terminal 110 at the time of the normal mode by a predetermined value. Unlike the tenth embodiment in which each of the electric potential of the power terminal 110 and the output terminal 111 is raised from 5V (to 12V) when the adjusting mode is requested, in the present embodiment each of the electric potential of the power terminal 110 and the output terminal 111 is lowered from 5V (to 4V). Therefore, the measurement device 10C according to the present embodiment does not require electrical components (that is, high voltage electrical components) being capable of withstanding an electrical potential (for example 12V) being higher than an electrical potential (for example 5V) which is applied to in the normal mode. Accordingly, the measurement device 10C is capable of being downsized and is capable of lowering its production costs.

12th Embodiment

Figure 20:
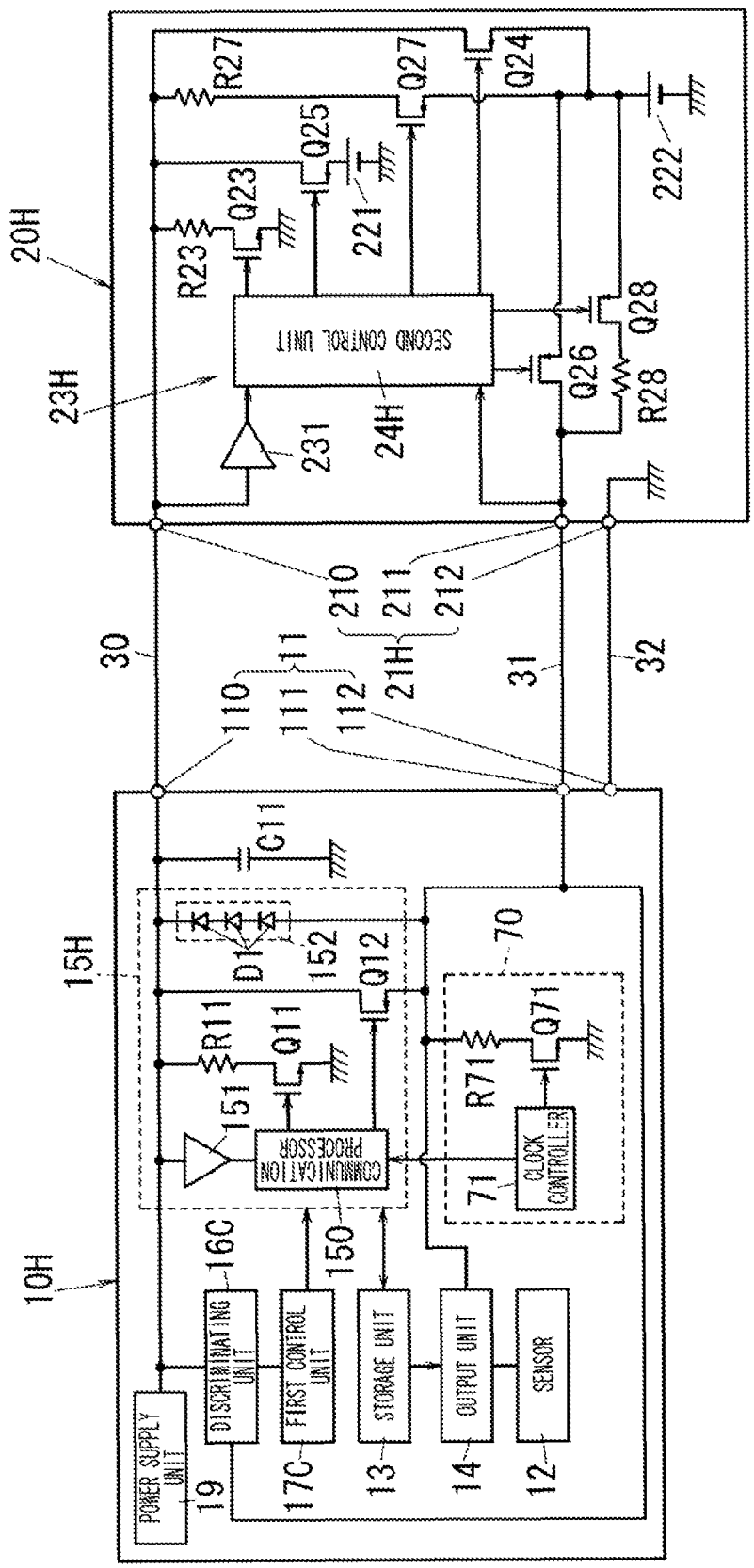
FIG. 20 shows a block diagram illustrating a physical quantity detecting system employing a physical quantity measurement device of a 12th embodiment.

Now referring to FIG. 20, an explanation is made to a measurement device 10H according to the twelfth embodiment of the present invention which is basically identical to the fifth embodiment except for inclusion of an associated modification of a clock signal output unit 70, and the first communication unit 15H. Moreover, an explanation is made to a management device 20H mentioned in the twelfth embodiment which is basically identical to the management device 20C mentioned in the fifth embodiment except for inclusion of an associated modification of the second terminal unit 21H, the second communication unit 23H, and the second control unit 24H. Like parts are designated by like reference numerals optionally with a suffix letter of "H", and no duplication explanation is deemed necessary.

The clock signal output unit 70 includes a clock controller 71, a switch Q71, and a resistor R71. The switch Q71 is an N-channel MOSFET, and is connected between the output terminal 111 and the ground. The resistor R71 is connected between the output terminal 111 and the switch R71.

The clock controller 71 is configured to output a clock signal (an external clock signal) to the output terminal 111 and output a clock signal (an internal clock signal) to the communication processor 150 while the operational mode of the measurement device 10H is the adjusting mode. The clock controller 71 generates the external clock signal by means of turning on and off the switch Q71 at a predetermined cycle on the basis of a clock signal output from an incorporated clock generator (not shown). The internal clock signal has its phase and cycle identical to those of the external clock signal, respectively.

The clock controller 71 is configured not to output the external clock signal and the internal clock signal while the operational mode of the measurement device 10H is the normal mode, and turn off the switch Q71 in order to output the detection signal from the output unit 14 to the output terminal 111.

The first communication unit 15H includes the communication processor 150, the judging circuit 151, switches Q11 and Q12, the resistor R11, and the voltage lowering circuit 152.

The communication processor 150 uses a time interval between trailing edges of the internal clock signal as a length of one bit of the serial signal. In the transmission processing, the communication processor 150 controls the switches Q11 and Q12 such that the serial signal becomes the high level or the low level while the internal clock signal becomes a high level. In the reception processing, the communication processor 150 determines a bit value by use of the judgment of the judging circuit 151 at the time of the leading edge of the internal clock signal.

The first communication unit 15H is configured to receive the serial signal being input to the power terminal 110 and output the serial signal to the power terminal 110 in synchronization with the internal clock signal obtained from the clock signal output unit 70. The first communication unit 15H establishes the serial communications by use of the power terminal 110 as an input output terminal of the serial signal.

The second terminal unit 21H includes a reference terminal 212 in addition to the feed unit 210 and the input terminal 211. The reference terminal 212 is grounded. For example, the reference terminal 212 is connected to the automobile body. The reference terminal 212 is connected to the ground terminal 112 of the measurement device 10H through the earthing wire in order to ground the ground terminal 112.

The second control unit 24H configured to execute a serial signal reception processing and a serial signal transmission processing as with the communication processor 230. That is, the second control unit 24H acts as the communication processor 230 of the second communication unit 23H. Therefore, the second communication unit 23H is composed of the second control unit 24H, the judging circuit 231, two switches Q23 and Q24, and a resistor R23. The switch Q23 is an N-channel MOSFET, and is connected between the feed terminal 210 and the ground. The resistor R23 is connected between the feed terminal 210 and the switch Q23. The switch Q24 is a P-channel MOSFET, and is connected between the feed terminal 210 and the second feed unit 222.

The second control unit 24 changes the electric potential of the serial signal into the high level potential by means of turning off the switch Q23 and turning on the switch Q24, in the transmission processing. In this case, the high level potential of the serial signal is 12V, because the switch Q24 connects the second feed unit 222 to the feed terminal 210. Further, the second control unit 24 changes the electric potential of the serial signal into the low level potential by means of turning on the switch Q23 and turning off the switch Q24. In this case, the low level potential of the serial signal is equal to the electric potential of the output terminal 111 lowered by the electric potential lowering circuit 152. In the present embodiment, the low level potential of the serial signal is 9.9 V. The second control unit 24H turns off the switches Q23 and Q24 during an idle state in which the second control unit 24H is waiting for reception of the serial signal from the measurement device 10H.

Further, as with the second control unit 24 mentioned in the fifth embodiment, the second control unit 24H has a function that the second control unit 24H requests the measurement device 10H to switch its operational mode.

The management device 20H further includes four switches Q25, Q26, Q27 and Q28, and two resistors R27 and R28. The switch Q25 is connected between the first feed unit 221 and the feed terminal 210. The switch Q26 is connected between the second feed unit 222 and the input terminal 211. The switch Q27 and the resistor R27 are connected in series between the second feed unit 222 and the feed terminal 210. The switch Q28 and the resistor R28 are connected in series between the second feed unit 222 and the input terminal 211. Each of the switches Q25 to Q28 is a P-channel MOSFET.

The second control unit 24H is configured to turn on the switch Q25 and to turns off the switches Q26, Q27, and Q28 upon receiving the instruction which indicates switching the operational mode from the adjusting mode to the normal mode. Therefore, the feed terminal 210 receives an electric potential of 5V.

The second control unit 24H is configured to turn off the switch Q25 and to turns on the switches Q26, Q27, and Q28 upon receiving the instruction which indicates switching the operational mode from the normal mode to the adjusting mode. Therefore, both of the feed terminal 210 and the input terminal 211 receive an electric potential of 12V.

As described above, the management device 20H sets both of the electric potential of the power terminal 110 and the output terminal 111 higher than those at the time of the normal mode. In the present embodiment, the management device 20H raises the electric potential of the power terminal 110 and the output terminal 111 to 12V.

The second control unit 24H turns off the switch Q26 to receive the external clock signal from the clock signal output circuit 70 after requesting the adjusting mode. Upon receiving the external clock signal, the second control unit 24H generates the second communication clock on the basis of the cycle and phase of the received external clock signal. The second control unit 24H establishes the serial communications by use of the feed terminal 111 as an input output terminal of the serial signal on the basis of the second communication clock.

Next, the operation of the physical quantity detecting system employing the measurement device 10H is explained.

When the adjusting mode is selected by use of the input output device, the second control unit 24H turns on the switches Q25, Q26, Q27 and Q28. The second control unit 24H further turns off the switches Q23 and Q24. Each of the power terminal 110 and the output terminal 111 of the measurement device 10H receives an electrical potential of 12V. More precisely, the electrical potential of the power terminal 110 becomes a potential being obtained by subtracting from 12V a voltage drop of the resistor R27 caused by a consumption current of the measurement device 10H. However, in the below-mentioned explanation, the consumption current is not taken into consideration in order to simplify explanations.

As a result, the measurement device 10H starts to operate in the adjusting mode. In the adjusting mode, the first control unit 17C deactivates the sensor 12 and the output unit 14, and activates the first communication unit 15H and the clock signal output unit 70. In the clock signal output unit 70, the clock controller 71 starts to operate, and then outputs the internal clock signal to the communication processor 150 and the external clock signal to the output terminal 111.

The second control unit 24H is configured to turn off the switch Q26 at predetermined timing after requesting the adjusting mode. Hereby, the resistor R28 is inserted between the second feed unit 222 and the input terminal 211. The electrical potential of the input terminal 211 rises while the switch Q71 of the clock signal output unit 70 is turned on, and lowers while the switch Q71 is turned off. That is, the second control unit 24H receives the external clock signal from the measurement device 10H by means of turning off the switch Q26. Upon receiving the external clock signal, the second control unit 24H generates the second communication clock on the basis of the cycle and phase of the received external clock signal. Besides, the predetermined timing is timing to start to receive the external clock signal. The second control unit 24H may turn off the switch Q26 at predetermined regular interval. Alternatively, the second control unit 24H may turn off the switch Q26 every predetermined number of times (for example, 5 times) of transmitting and receiving of the serial signal. The predetermined timing is set as preferable timing.

When a user inputs the correction value by use of the input output device, the second control unit 24H controls the second communication unit 23H such that the second control unit 23H transmits the correction data indicating the input correction value.

The first control unit 17C checks whether or not the production ID included in the correction data is identical to own production ID, upon receiving the correction data at the first communication unit 15H. When the production ID included in the received correction data is identical to own production ID, the first control unit 17C updates the correction value stored in the storage unit 13 to the received correction value from the management device 20H. By contrast, when the production ID included in the received correction data is not identical to own production ID, the first control unit 17C discards the received correction data. After the correction value is updated, the first control unit 17C controls the first communication unit 15H such that the first control unit 1511 transmits the response data indicating the updated correction value.

The second control unit 24H checks whether or not both of the correction value and the production ID included in the response data are identical to both of the correction data and the production ID included in the transmitted correction data to the measurement device 10H, upon receiving the response data at the second communication unit 23H. When both of the correction value and the production ID included in the received response data are identical to both of the correction value and the production ID included in the transmitted correction data to the measurement device 10H, the second control unit 24H judges that an update of the correction value has succeeded. When the correction value included in the received response data is not identical to the correction value included in the transmitted correction data to the measurement device 10H, or when the production ID included in the received response data is not identical to the production ID included in the transmitted correction data to the measurement device 10H, the second control unit 24H judges that the update of the correction value has failed. The second control unit 24H informs users of a result indicating whether or not the update of the correction value has succeeded, by use of the input output device.

When the normal mode is selected by use of the input output device, the second control unit 24H turns on the switch Q25, and turns off the switches Q23, Q24, Q26, Q27 and Q28. The power terminal 110 of the measurement device 10C receives an electrical potential of 5V. As a result, the first control unit 17C starts to operate in the normal mode. In the normal mode, the first control unit 17C activates the sensor 12 and the output unit 14, and deactivates the first communication unit 15 and the clock signal output unit 70. In the clock signal output unit 70, the clock controller 71 turns off the switch Q71, and terminates outputting the internal clock signal and the external clock signal.

As described above, the second communication unit 23H transmits and receives the serial signal coincident with the external clock signal. The first communication unit 15H transmits and receives the serial signal coincident with the internal clock signal. Accordingly, the management device 20H synchronizes with the measurement device 10H on the basis of the received external clock signal from the measurement device 10H.

Since the management device 20H does not use the synchronous bit 60 in order to synchronize with the measurement device 10H, the management device 20H does not suffer from the measurement error of the length of the synchronous bit 60, and various noise. Therefore, the accuracy of the serial communications between the measurement device 10H and the management device 20H is improved.

Since the measurement device 10H and the management device 20H are capable of eliminating the time to execute the synchronous processing based on the synchronous bit 60, the present embodiment is capable of improving efficiency of processing for the serial communications. That is, the measurement device 10H and the management device 20H is capable of increasing data size transmitted per unit of time.

It is noted that each of switches Q11 to Q13 and Q22 to Q28 is not limited to such semiconductor switching elements as MOSFETs. Each of switches Q11 to Q13 and Q22 to Q28 may be a switch which is able to be turned on and off, such as electric relays.

Figure 21:
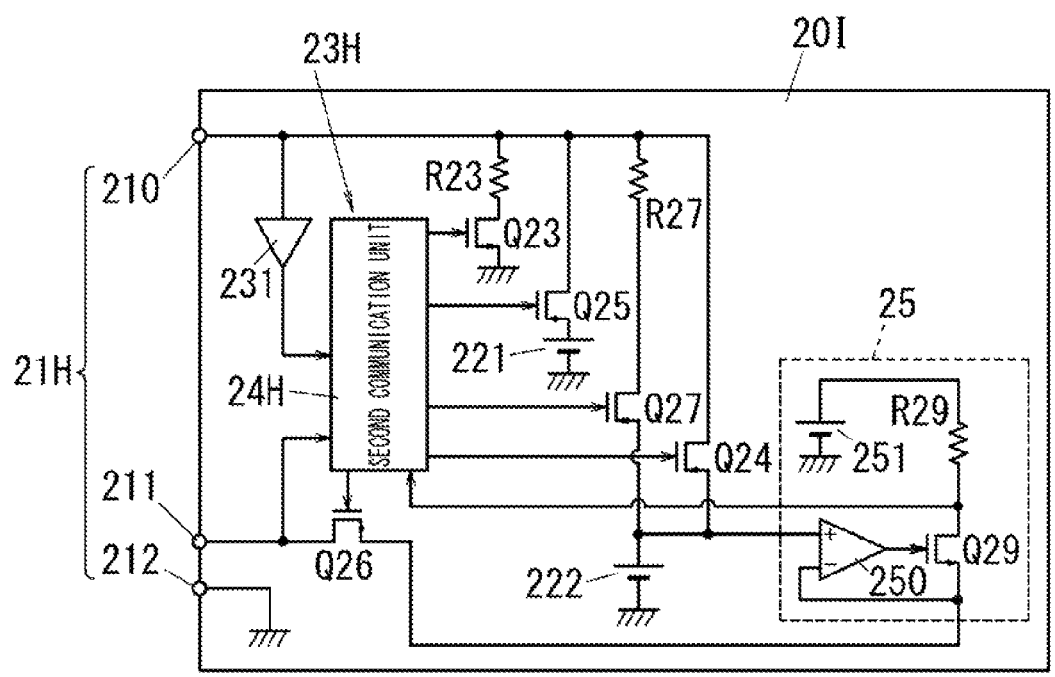
FIG. 21 shows a block diagram illustrating a modified physical quantity detecting system of the 12th embodiment.

Now referring to FIG. 21, an explanation is made to the modified management device 20I which is basically identical to the management device 20H except for inclusion of an associated modification of an electric potential keeping unit 25. Like parts are designated by like reference numerals optionally with a suffix letter of "I", and no duplication explanation is deemed necessary.

The electric potential keeping unit 25 includes an operational amplifier 250, a switch Q29 which is an N-channel MOSFET, a resistor R29, and a voltage regulator 251. The operational amplifier 250 has its noninverting input terminal connected to the second feed unit 222, and has its inverting input terminal connected to source of the switch Q29. The switch Q29 has its source connected to the input terminal 211 through the switch Q26, and has its drain connected to the voltage regulator 251 through the resistor R29. The voltage regulator 251 has an output electrical potential (an output voltage) higher than that of the second feed unit 222. In the present embodiment, the output electrical potential is 15V. The electrical potential keeping unit 25 keeps an electrical potential of source of the switch Q29 (namely the electrical potential of the input terminal 211) a constant value being identical to the output electrical potential of the second feed unit 222 by a feedback action of the operational amplifier 250

In the management device 20I, the potential of the input terminal 211 is kept constant (12V) without depending on turning on and off the switch Q71. Alternatively, a current flowing through the switch Q29 varies depending on turning on and off the switch Q71. In this modification, the external clock signal is a signal (an electrical current clock signal) having periodically changing electrical current rather than a signal having periodically changing electrical potential.

In the management device 20I, the second control unit 24H is configured to turn on the switch Q25 and to turns off the switches Q26 and Q27 upon receiving the instruction which indicates switching the operational mode from the adjusting mode to the normal mode. Therefore, the feed terminal 210 receives an electric potential of 5V, The second control unit 24I is configured to turn off the switch Q25 and to turns on the switches Q26 and Q27 upon receiving the instruction which indicates switching the operational mode from the normal mode to the adjusting mode. Therefore, the feed terminal 210 receives an electric potential of 12V. Since the input terminal 211 is connected to source of the switch Q29, the input terminal 211 receives an electric potential of 12V.

In the management device 20I, the second control unit 24H obtains the external clock signal by measuring the electrical current flowing through the switch Q29.

Next, the operation of the physical quantity detecting system employing the management device 20I is explained.

When the adjusting mode is selected by use of the input output device, the second control unit 24H turns on the switches Q26 and Q27, and off the switch Q25. Each of the power terminal 110 and the output terminal 111 of the measurement device 10H receives an electrical potential of 12V.

As a result, the measurement device 10H starts to operate in the adjusting mode. In the adjusting mode, the first control unit 17C deactivates the sensor 12 and the output unit 14, and activates the first communication unit 15 and the clock signal output unit 70. In the clock signal output unit 70, the clock controller 71 starts to operate, and then outputs the internal clock signal to the communication processor 150 and the external clock signal to the output terminal 111.

When the normal mode is selected by use of the input output device, the second control unit 24H turns on the switch Q25, and turns off the switches Q23, Q24, Q26, and Q27. The power terminal 110 of the measurement device 10C receives an electrical potential of 5V. As a result, the first control unit 17C starts to operate in the normal mode. In the normal mode, the first control unit 17C activates the sensor 12 and the output unit 14, and deactivates the first communication unit 15 and the clock signal output unit 70. In the clock signal output unit 70, the clock controller 71 turns off the switch Q71, and terminates outputting the internal clock signal and the external clock signal.

Now, referring to the physical quantity detecting system employing the management device 20H, the electric potential of the power terminal 110 is varied depending on the electrical potential of the output terminal in the adjusting mode. Turning on and off the switch Q71 changes not only the electrical potential of the output terminal 111 but also the electrical potential of the power terminal 110. Furthermore, the bypass capacitor C11 connected to the power terminal 110 dulls the electrical potential waveform of the power terminal 110. The variation of the electrical power potential of the power terminal 110 and the dulled electrical potential waveform cause negative effect on the judging circuit 151. The judging circuit 151 is required to include special components which prevent the negative effect in order to improve the accuracy of the serial communications.

However, in the physical quantity detecting system employing the management device 20I, the electrical potential keeping unit 25 keeps the electrical potential of the input terminal 211 constant in the adjusting mode. Therefore, the electrical potential of the output terminal 111 is also kept constant in the adjusting mode. Accordingly, the judging circuit 151 does not suffer from above-mentioned negative effect without the special components.

The invention claimed is:

1. A physical quantity measurement device comprising:
   a terminal unit having a power terminal, an output terminal, and a ground terminal, said power terminal and said output terminal being adapted in use to be connected to an external device;
   a sensor configured to detect a predetermined physical quantity;
   a storage unit configured to store predetermined property information;
   an output unit configured to output the physical quantity detected by said sensor to said external device;
   a communication unit configured to establish serial communications with said external device;
   a control unit configured to have an adjusting mode in which said control unit updates said property information stored in said storage unit to receive said property information from said external device, and a normal mode in which said control unit does not update said property information stored in said storage unit; and
   a discriminating unit configured to judge whether or not an electrical potential of each of said power terminal and said output terminal satisfies a predetermined condition, said discriminating unit being configured to decide that said external device requests said adjusting mode when the electrical potential of each of said power terminal and said output terminal satisfies the predetermined condition, and said discriminating unit being configured to decide that said external device requests said normal mode when the electrical potential of at least one of said power terminal and said output terminal does not satisfy the predetermined condition,
   wherein said control unit is configured to select said normal mode when said discriminating unit decides that said external device requests said normal mode, and is configured to select said adjusting mode when said discriminating unit decides that said external device request said adjusting mode, and
   wherein said communication unit is configured to use said power terminal in order to receive a serial signal from said external device.

2. A physical quantity measurement device as set forth in claim 1,
   wherein said discriminating unit is configured to decide that said external device requests said adjusting mode, when the electrical potential of each of said power terminal and said output terminal satisfies the predetermined condition for a predetermined time period.

3. A physical quantity measurement device as set forth in claim 1 further comprising:
   a power supply unit configured to generate a drive voltage for activating said physical quantity measurement device,
   wherein said external device is configured to energize said physical quantity measurement device through said power terminal while said external device requests said normal mode, and to energize said physical quantity measurement device through said output terminal while said external device requests said adjusting mode, and wherein said power supply unit is configured to generate the drive voltage by use of power received from said external device via said power terminal in said normal mode, and is configured to generate the drive voltage by use of power received from said external device via said output terminal in said adjusting mode.

4. A physical quantity measurement device as set forth in claim 3, wherein said communication unit is configured to change an electrical potential of a serial signal to be transmitted to said external device into high-level by short circuiting between said output terminal and said power terminal.

5. A physical quantity measurement device as set forth in claim 3, wherein said communication unit includes a voltage lowering circuit configured to lower an electric potential of said output terminal at the time of said adjusting mode and to apply the same to said power terminal, wherein said communication unit is configured to utilize an electric potential applied to said power terminal by said voltage lowering circuit as a low-level potential of an output serial signal to be transmitted to said external device, and wherein said voltage lowering circuit is composed of a diode having its anode coupled to said output terminal and having its cathode coupled to said power terminal.

6. A physical quantity measurement device as set forth in claim 3 further comprising:

a bypass capacitor coupled to said power terminal, wherein said communication unit includes a driver circuit configured to lower an electric potential of said power terminal to an electric potential corresponding to a low-level of an output serial signal to be transmitted to said external device from an electric potential corresponding to a high-level of the output serial signal, wherein said driver circuit is configured to increase a discharge current of said bypass capacitor at the start of switching a level of said output serial signal to low-level from high-level than at the end of the switching.

7. A physical quantity measurement device as set forth in claim 1 further comprising:

an integrated circuit composed of a monolithic integrated circuit, wherein said integrated circuit includes said terminal unit, said storage unit, said output unit, said communication unit, said control unit, said discriminating unit, a semiconductor element, and a switching unit, wherein said external device is configured to connect said feed unit to said power terminal while said external device requests said normal mode, and to connect said feed unit to said output terminal while said external device requests said adjusting mode, wherein said semiconductor element includes an N-type bulk, and a P-type region formed in said N-type bulk, and wherein said switching unit is configured to couple said N-type bulk of said semiconductor element to said power terminal in said normal mode and to couple said N-type bulk of said semiconductor element to said output terminal in said adjusting mode.

8. A physical quantity measurement device as set forth in claim 1 further comprising:

an integrated circuit composed of a monolithic integrated circuit, wherein said integrated circuit includes said terminal unit, said storage unit, said output unit, said communication unit, said control unit, said discriminating unit, a semiconductor element, a comparing unit and a switching unit, wherein said semiconductor element includes an N-type bulk and a P-type region formed in said N-type bulk, wherein said P-type region is connected to said power source or said output terminal, wherein said comparing unit is configured to compare an electric potential of said power terminal with an electric potential of said output terminal, and wherein said switching unit is configured to couple said N-type bulk of said semiconductor element to said power terminal when a discrimination of said discriminating unit indicates said normal mode, and to couple said N-type bulk of said semiconductor element to one having the highest potential among said power terminal and said output terminal on the basis of a comparison result of said comparing unit when said discriminating unit indicates said adjusting mode.

* * * * *